United States Patent
Noffke

(10) Patent No.: US 8,817,345 B2
(45) Date of Patent: *Aug. 26, 2014

(54) IMAGE PROCESSING USING MULTIPLE IMAGING DEVICES

(71) Applicant: Quad/Tech, Inc., Sussex, WI (US)

(72) Inventor: Patrick James Noffke, Hartland, WI (US)

(73) Assignee: Quad/Tech, Inc., Sussex, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/893,946

(22) Filed: May 14, 2013

(65) Prior Publication Data
US 2013/0321887 A1 Dec. 5, 2013

Related U.S. Application Data

(63) Continuation of application No. 12/129,452, filed on May 29, 2008, now Pat. No. 8,441,700, which is a continuation-in-part of application No. 10/424,230, filed on Apr. 25, 2003, now Pat. No. 7,627,141, which is a continuation-in-part of application No. 10/790,451, filed on Feb. 17, 2004, now abandoned.

(51) Int. Cl.
*H04N 1/46* (2006.01)

(52) U.S. Cl.
USPC .......................................... 358/514; 358/513

(58) Field of Classification Search
None
See application file for complete search history.

(56) References Cited

U.S. PATENT DOCUMENTS

| | | |
|---|---|---|
| 5,163,012 A | 11/1992 | Wuhrl et al. |
| 5,182,721 A | 1/1993 | Kipphan et al. |
| 5,305,099 A | 4/1994 | Morcos |
| 5,374,988 A | 12/1994 | Wertz et al. |
| 5,384,859 A | 1/1995 | Bolza-Schunemann et al. |
| 5,412,577 A | 5/1995 | Sainio et al. |
| 5,432,609 A | 7/1995 | Sugiyama et al. |
| 5,543,922 A | 8/1996 | Runyan et al. |

(Continued)

FOREIGN PATENT DOCUMENTS

| | | |
|---|---|---|
| DE | 43 31 772 | 3/1995 |
| EP | 0 508 257 | 10/1992 |

(Continued)

OTHER PUBLICATIONS

Communication from European Patent Office for Application No. 04 252 096.5-2217, Ref. DE/PO04720PEP, dated Apr. 29, 2008, 6 pages.

(Continued)

*Primary Examiner* — Marcus T Riley
(74) *Attorney, Agent, or Firm* — Foley & Lardner LLP

(57) ABSTRACT

Apparatus and methods for image processing using multiple imaging devices are provided. A first imaging device is configured to acquire a first image of a portion of a printed substrate and the second imaging device is configured to acquire a second image of a portion of the printed substrate. At least a portion of the first image and the second image are acquired from the same portion of the printed substrate at the same time. The first imaging device is configured to process color data from the first image using a first processing circuit of the first imaging device and the second imaging device is configured to process spatial information from the second image using a separate second processing circuit of the second imaging device.

20 Claims, 22 Drawing Sheets

(56) References Cited

U.S. PATENT DOCUMENTS

| | | | |
|---|---|---|---|
| 5,689,425 A | 11/1997 | Sainio et al. | |
| 5,696,890 A | 12/1997 | Geissler et al. | |
| 5,724,259 A * | 3/1998 | Seymour et al. | 382/199 |
| 5,767,980 A | 6/1998 | Wang et al. | |
| 5,774,225 A | 6/1998 | Goldstein et al. | |
| 5,809,894 A | 9/1998 | Goldstein | |
| 5,886,775 A | 3/1999 | Houser et al. | |
| 5,967,050 A | 10/1999 | Seymour | |
| 5,999,636 A * | 12/1999 | Juang | 382/112 |
| 6,008,905 A | 12/1999 | Breton et al. | |
| 6,024,018 A | 2/2000 | Darel et al. | |
| 6,058,201 A | 5/2000 | Sikes et al. | |
| 6,085,658 A | 7/2000 | Goldstein | |
| 6,178,254 B1 | 1/2001 | Rappette et al. | |
| 6,373,964 B1 | 4/2002 | Geissler et al. | |
| 6,384,918 B1 | 5/2002 | Hubble et al. | |
| 6,583,879 B1 | 6/2003 | Berg et al. | |
| 6,630,995 B1 | 10/2003 | Hunter | |
| 7,049,597 B2 * | 5/2006 | Bodkin | 250/353 |
| 7,627,141 B2 * | 12/2009 | Noffke et al. | 382/112 |
| 8,441,700 B2 * | 5/2013 | Noffke | 358/509 |
| 2002/0026879 A1 | 3/2002 | Goldstein | |
| 2002/0150299 A1 | 10/2002 | Miller | |
| 2004/0119020 A1 * | 6/2004 | Bodkin | 250/353 |
| 2004/0213436 A1 | 10/2004 | Noffke et al. | |
| 2008/0297861 A1 * | 12/2008 | Noffke | 358/509 |

FOREIGN PATENT DOCUMENTS

| | | |
|---|---|---|
| EP | 1 197 331 | 4/2002 |
| GB | 2 271 080 | 4/1994 |
| JP | 61-112931 | 10/1986 |
| WO | WO-95/31333 | 11/1995 |
| WO | WO-02/50518 | 6/2002 |

OTHER PUBLICATIONS

Communication from European Patent Office for Application No. 04 252 096.5-2217, Ref. DE/PO04720PEP, dated Jan. 5, 2005, 6 pages.
Communication from European Patent Office for Application No. 04 252 096.5-2217, Ref. DE/PO04720PEP, dated May 2, 2007, 3 pages.
Communication from European Patent Office for Application No. 04 252 096.5-2217, Ref. DE/PO04720PEP, dated May 29, 2009, 3 pages.
Communication from European Patent Office for Application No. 04 252 096.5-2217, Ref. DE/PO04720PEP, dated Jun. 9, 2006, 6 pages.
Communication from European Patent Office for Application No. 04 252 096.5-2217, Ref. DE/PO04720PEP, dated Sep. 23, 2005, 6 pages.
European Search Report for Application No. 04 252 096.5, dated Sep. 23, 2005, 17 pages.
Notice of Allowance for U.S. Appl. No. 12/129,452, mail date Jan. 17, 2013, 10 pages.
Notice of Allowance for U.S. Appl. No. 12/621,293, mail date Aug. 31, 2010, 7 pages.
Notice of Allowance of U.S. Appl. No. 10/424,230, mail date Jul. 23, 2009, 7 pages.
Notice of Allowance of U.S. Appl. No. 10/424,230, mail date Jul. 31, 2009, 4 pages.
Office Action for U.S. Appl. No. 10/424,230, mail date Dec. 23, 2008, 5 pages.
Office Action for U.S. Appl. No. 10/424,230, mail date Jan. 11, 2007, 5 pages.
Office Action for U.S. Appl. No. 10/424,230, mail date Jul. 9, 2008, 9 pages.
Office Action for U.S. Appl. No. 10/424,230, mail date Mar. 17, 2009, 6 pages.
Office Action for U.S. Appl. No. 10/424,230, mail date May 30, 2007, 9 pages.
Office Action for U.S. Appl. No. 10/424,230, mail date Nov. 15, 2007, 11 pages.
Office Action for U.S. Appl. No. 10/790,451, mail date Dec. 10, 2007, 24 pages.
Office Action for U.S. Appl. No. 10/790,451, mail date Jun. 28, 2007, 16 pages.
Office Action on U.S. Appl. No. 12/129,452 mail date Feb. 13, 2012.
Office Action on U.S. Appl. No. 12/129,452 mail date Aug. 9, 2011.
Office Action on U.S. Appl. No. 12/129,452 mail date Sep. 7, 2012.
Printed website pages from http://www.specim.fi/print-products-imspector.html, printed Jun. 30, 2004, U.S.A.
Printed website pages from http://www.specim.fi/print-products-spectralimagingsystems.html, printed Jun. 30, 2004, U.S.A.
Spratlin et al., Color Measurements Using a Colorimeter and a CCD Camera, SPIE vol. 1670 Color Hard Copy and Graphic Arts (1992), Oak Ridge, TN.
Supplemental Notice of Allowability for U.S. Appl. No. 10/424,230, mail date Jul. 31, 2009, 4 pages.
VTT Technical Research Centre of Finland, Hyperspectral prism-grating-prism imaging spectrograph, 2001.

* cited by examiner

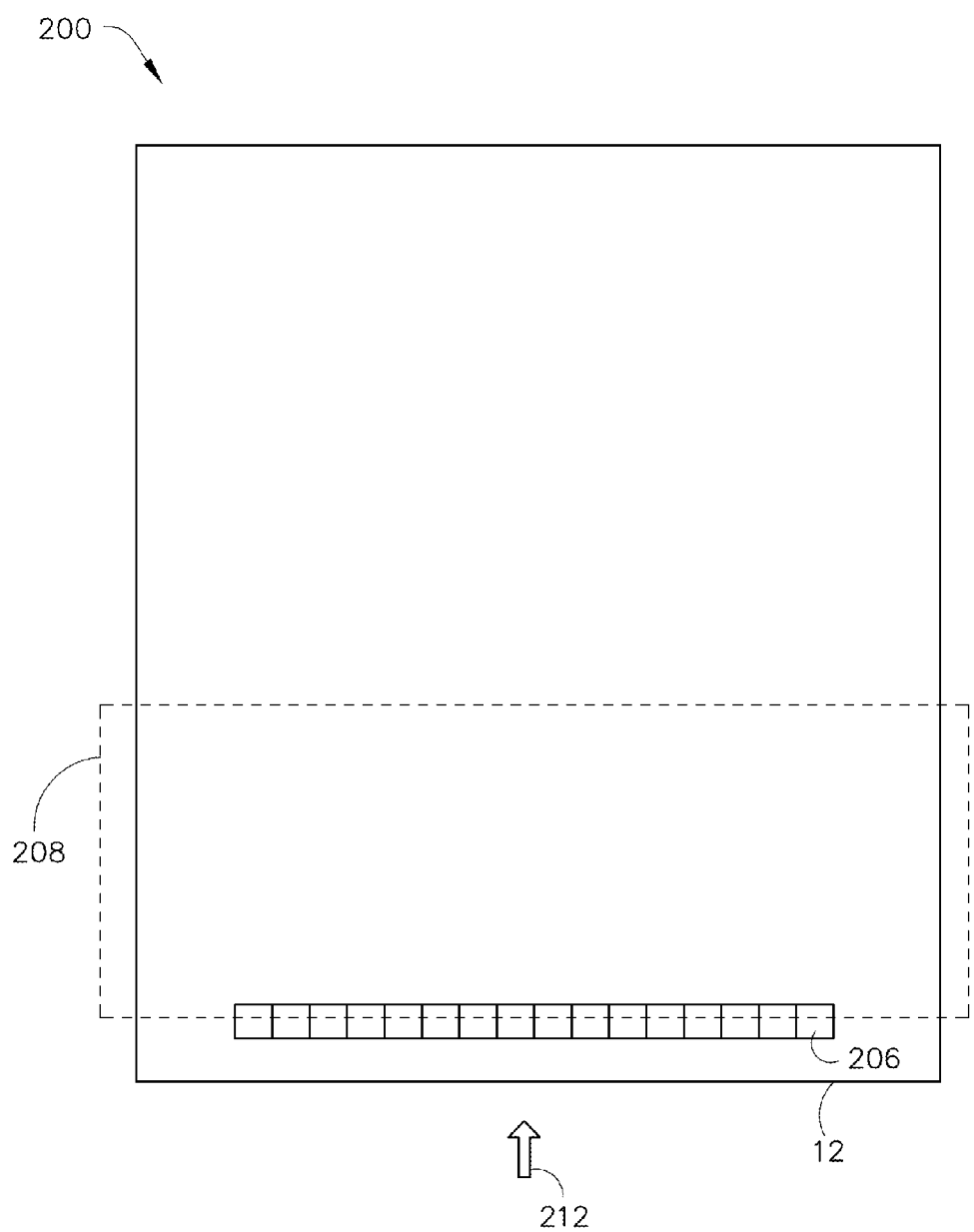

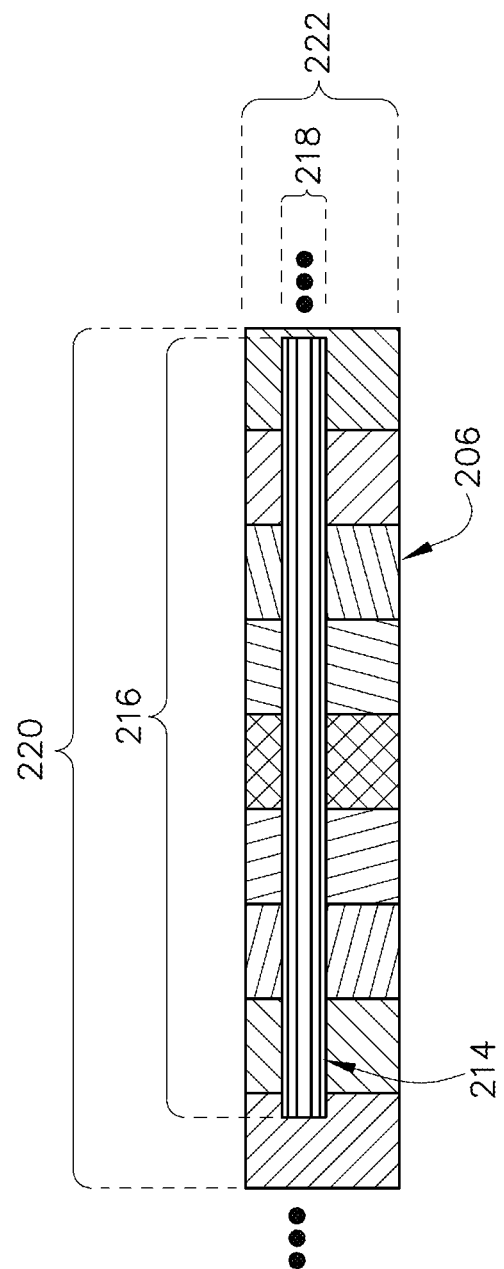

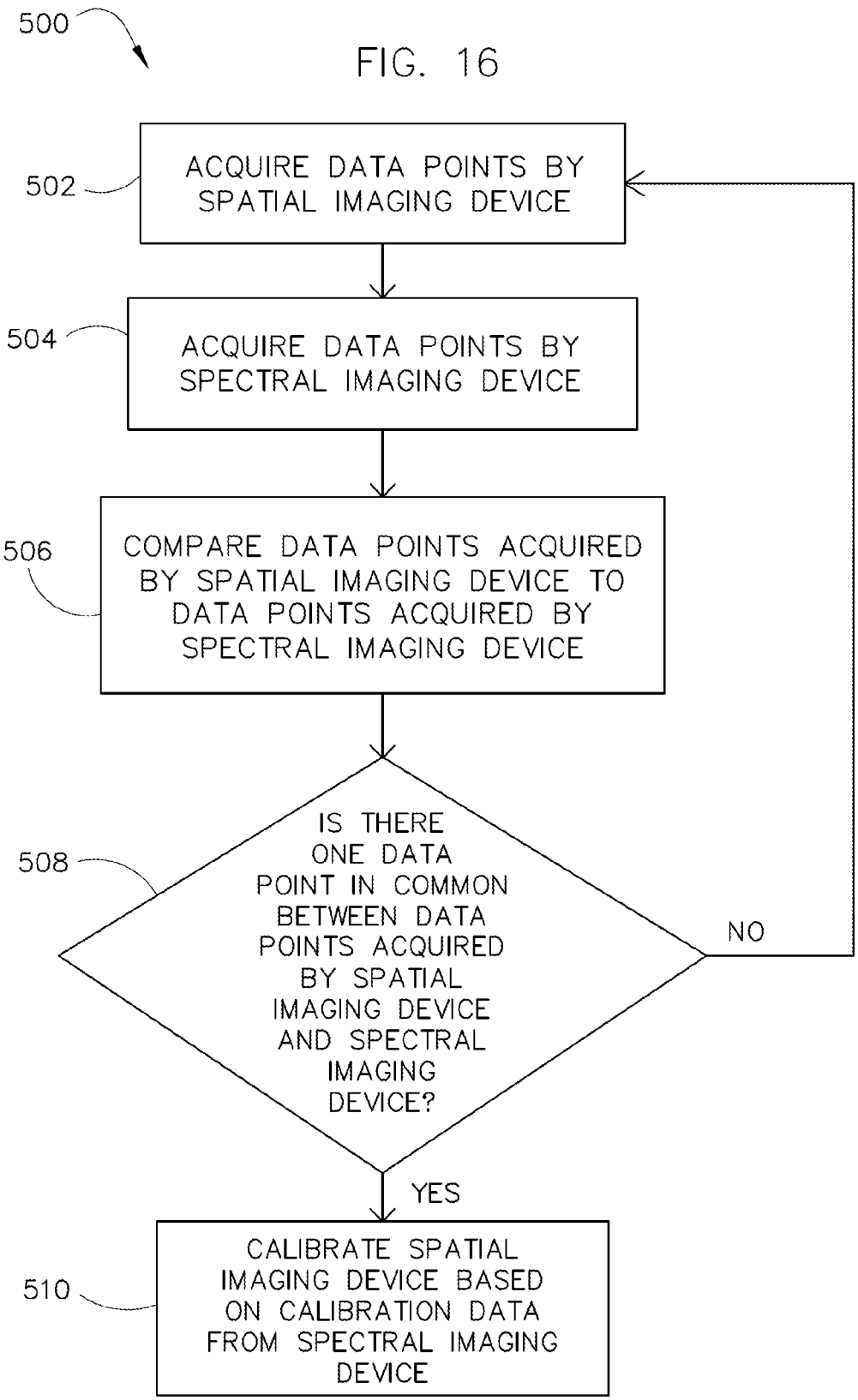

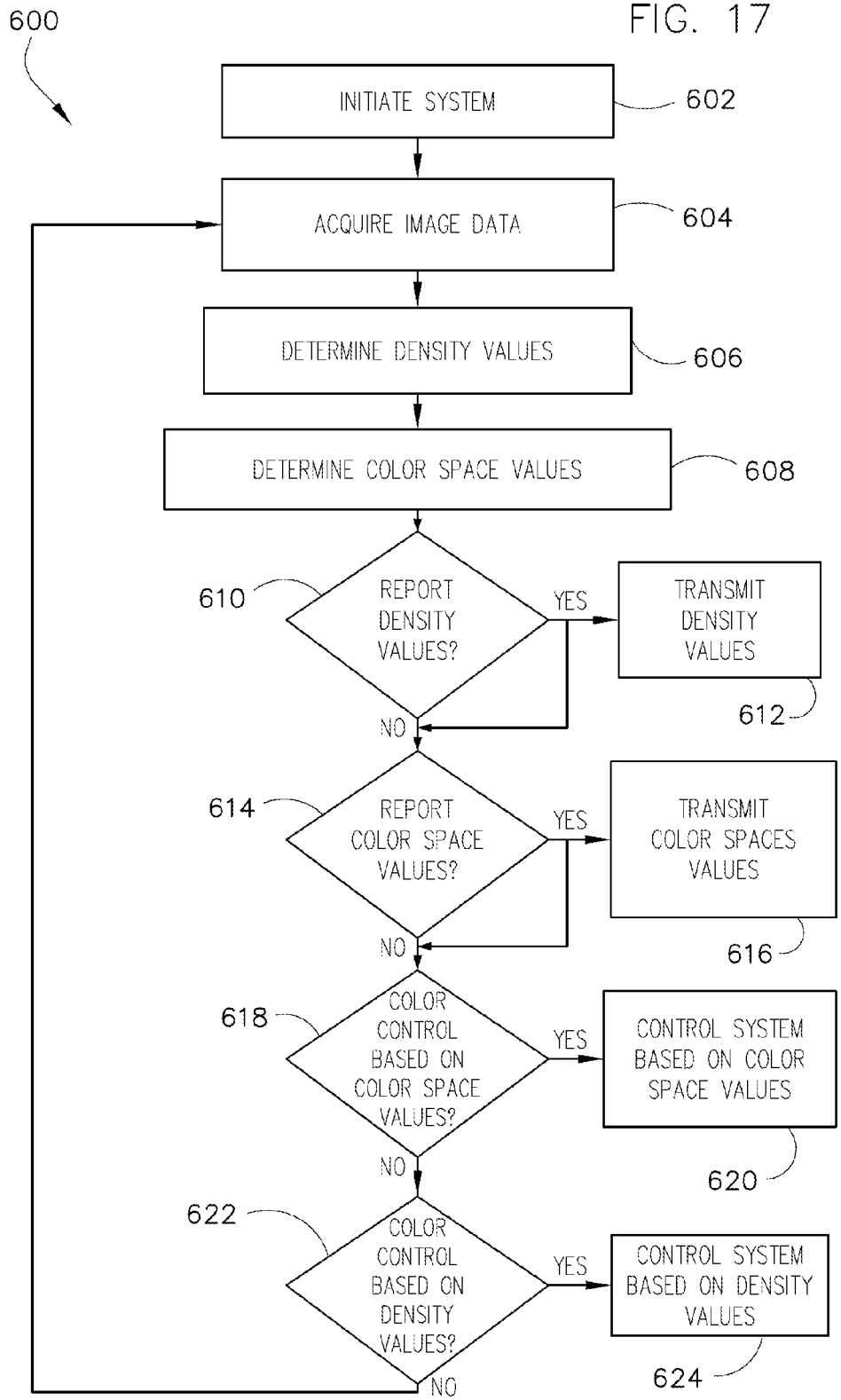

IMAGE PROCESSING USING MULTIPLE IMAGING DEVICES

CROSS-REFERENCE TO RELATED PATENT APPLICATIONS

This application is a continuation of prior application Ser. No. 12/129,452, filed May 29, 2008, which is a continuation-in-part of prior application Ser. No. 10/424,230, filed Apr. 25, 2003 and a continuation-in-part of prior application Ser. No. 10/790,451, filed Feb. 17, 2004, all of which are incorporated herein by reference in their entireties.

BACKGROUND

The present disclosure relates to an apparatus for measuring spectral and spatial information on a printing press.

In the printing industry, a desired image is repeatedly printed on a continuous web or substrate such as paper. In a typical printing process, the continuous web is slit in the longitudinal direction (the direction of web movement) to produce a plurality of continuous ribbons. The ribbons are aligned one on top of the other, folded longitudinally, and then cut laterally to produce a plurality of multi-page, approximately page-length segments, each of which is termed a "signature". The term signature also encompasses a single printed sheet that has or has not been folded.

To monitor the print quality on a signature, various methods may be used to measure the color quality of the printed signature. One method includes printing a colorbar having multiple color patches of different known colors and intensities such that the color quality of the colorbar can be measured and compared to a standard, the colorbar being representative of the color quality of the printed signature. By so doing, the color quality of the printed signature may be measured by utilizing an image processing apparatus (e.g., a camera) to acquire an image of a single point of the printed colorbar. Current image processing apparatus systems for measuring the color quality may utilize a single camera, such as a charge-coupled device ("CCD") color camera having red, green, and blue channels (i.e., an RGB camera).

It may also be desired to provide an image processing device that can take color measurements at a high rate of speed. The ability to take color measurements at a high rate of speed would allow for more direct measurement of the printed image (i.e., the ability to measure color in the work in addition to the colorbar), would make the control system respond faster to color errors, and would assist in locating a desired place on the signature with a searching algorithm for additional measurements.

SUMMARY

According to one exemplary embodiment, an image processing apparatus for use with a printed substrate includes a first imaging device configured to receive light reflected from the printed substrate and configured to process color data from the light and a second imaging device configured to receive light reflected from the printed substrate and configured to process spatial information from the light. The first imaging device is configured to acquire a first image of a portion of the printed substrate and the second imaging device is configured to acquire a second image of a portion of the printed substrate. At least a portion of the first image and the second image are acquired from the same portion of the printed substrate at the same time. The first imaging device is configured to process the color data from the first image using a first processing circuit of the first imaging device and the second imaging device is configured to process the spatial information from the second image using a separate second processing circuit of the second imaging device.

According to another exemplary embodiment, an image processing apparatus for use with a printed substrate includes a first imaging device configured to receive light reflected from a portion of a colorbar on the printed substrate and configured to process color data from the light reflected from the portion of the colorbar. The image processing apparatus further includes a second imaging device configured to receive light reflected from the printed substrate and configured to process spatial information from the light. The first imaging device is configured to acquire a first image of a portion of the printed substrate and the second imaging device is configured to acquire a second image of a portion of the printed substrate. At least a portion of the first image and the second image are acquired from the same portion of the printed substrate at the same time. The first imaging device is configured to process the color data from the first image using a first processing circuit of the first imaging device and the second imaging device is configured to process the spatial information from the second image using a separate second processing circuit of the second imaging device.

According to another exemplary embodiment, a method includes acquiring a first image of a portion of a printed substrate using a first imaging device and acquiring a second image of a portion of the printed substrate using a second imaging device. At least a portion of the first image and the second image are acquired from the same portion of the printed substrate at the same time. The method further includes processing color data from the first image using a first processing circuit of the first imaging device and processing spatial information from the second image using a separate second processing circuit of the second imaging device.

Other features and advantages of the disclosure will become apparent to those skilled in the art upon review of the following detailed description, drawings, and claims.

BRIEF DESCRIPTION OF THE DRAWINGS

FIGS. 12A-12C illustrate detecting a colorbar and focusing light onto the colorbar, according to an exemplary embodiment;

FIG. 13 is an illustration of acquiring a portion of multiple patches along the colorbar, according to an exemplary embodiment;

FIG. 16 is a flowchart for calibrating a spatial imaging device based on calibration data from a spectral imaging device, according to an exemplary embodiment; and FIG. 17 is a flowchart for controlling color in a printing operation and reporting out data including color space data and density data, according to an exemplary embodiment.

DETAILED DESCRIPTION

Figure 1:
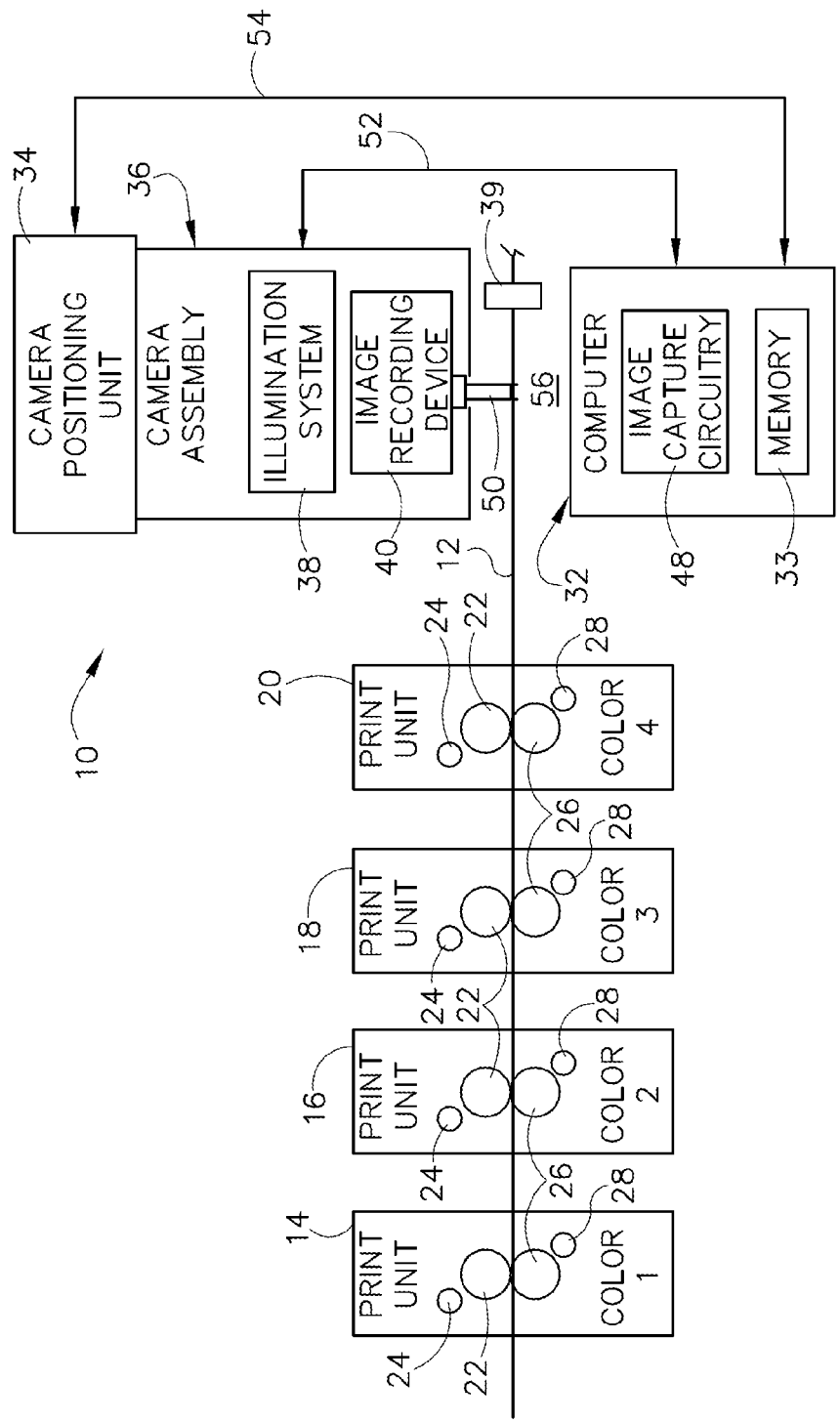
FIG. 1 is a block diagram of a printing system.

Referring to FIG. 1, a printing system 10 for printing a multi-color image upon a web 12 is illustrated. In the illustrated embodiment, four printing units 14, 16, 18, and 20 each print one color of the image upon web 12. This type of printing is commonly referred to as web offset printing. Each printing unit 14, 16, 18, 20 may include an upper blanket cylinder 22, an upper printing plate cylinder 24, a lower blanket cylinder 26, and a lower printing plate cylinder 28. In printing system 10, colors 1, 2, 3, and 4 on printing units 14, 16, 18, and 20 respectively, may be black (K), cyan (C), magenta (M), and yellow (Y). However, it is understood that any colors of ink may be effectively analyzed by the present disclosure. The location of printing units 14, 16, 18, and 20 relative to each other is determined by the printer, and may vary.

In the illustrated embodiment, printing system 10 is a web offset press. It is contemplated, however, that the present disclosure may be applicable to other types of printing systems 10, such as rotogravure, flexographic, and sheet-fed presses. The present disclosure may also be used for other applications, such as for use in the packaging industry.

Printing system 10 may include an image processing apparatus 36 in optical communication with web 12. Image processing apparatus 36 may include an illumination system 38 and an image recording device 40. The specific configuration of image processing apparatus 36 will be described in more detail below. Printing system 10 may include a camera positioning unit 34, a computer 32, and a web stabilizer 39.

In the printing industry, a printer may print one or more colorbars along an edge portion of web 12. Colorbars may include multiple patches of different colors (K, C, M, and Y), intensities, and half-tone values (such as 25% patches, 50% patches, and 75% patches). Image processing apparatus 36 may capture an image of these colorbars to monitor the color quality of web 12. However, it is understood that in some applications, the colorbars may not be necessary as measurements may be taken from any region within the printed region. The information obtained from the colorbars or from any other position on web 12 will be described in more detail below.

In general operation, camera positioning unit 34 may move image processing apparatus 36 to a first position on web 12. A printed image may be illuminated by illumination system 38 and image recording device 40 may record an image signal which is representative of a portion of the printed substrate within field of view 56. Illumination system 38 may be synchronized with the movement of web 12 such that the recorded image signal includes a portion of the colorbars. Illumination system 38 may be a strobed light, a non-strobed light, an AC light source, a DC light source, or a light-emitting diode ("LED").

Computer 32 may include random access memory 33 (semiconductor memory and/or disk drive storage) and an image capture circuitry 48 which interfaces with image processing apparatus 36. In other embodiments, computer 32 may be a microprocessor housed within image processing apparatus 36.

Figure 2:
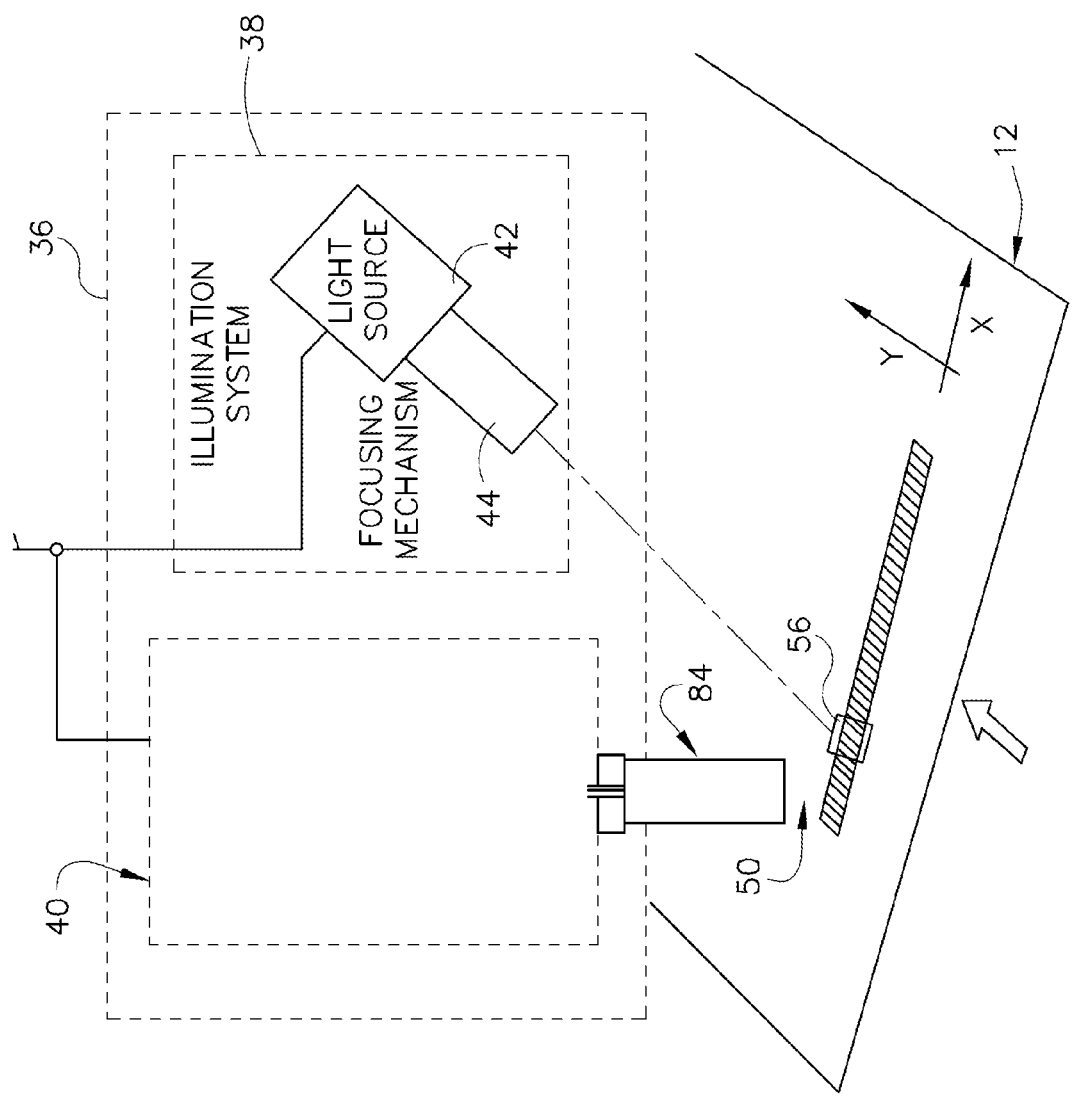
FIG. 2 illustrates an image processing apparatus assembly and a printed image within the field of view.

Computer 32 may be connected to camera positioning unit 34 by a communication link 54, and computer 32 may send control signals to camera positioning unit 34. Camera positioning unit 34 may be mechanically coupled to image processing apparatus 36 and may move image processing apparatus 36 in a direction perpendicular to web 12 motion, termed the lateral direction (X-axis, see FIG. 2). Moving image processing apparatus 36 across web 12 may allow for selective image recording of lateral portions of the printed image on web 12. Image processing apparatus 36 may record the printed image within field of view 56 for various positions of image processing apparatus 36 across web 12. Web 12 may be moving in the Y direction so that circumferential or Y-axis positioning by camera positioning unit 34 may not be necessary because the timing of the strobe light in illumination system 38 effectively provides circumferential positioning relative to moving web 12, as is further explained below.

It is also contemplated that a positioning unit may not be utilized, if, for example, a plurality of image processing apparatus 36 are combined to obtain a field of view that covers all required areas of web 12, or if only one area of web 12 is to be monitored. In an exemplary embodiment, one image processing apparatus 36 may be used to acquire data across substantially or all of web 12. In other exemplary embodiments, at least two image processing apparatus 36, at least three image processing apparatus 36, at least four image processing apparatus 36, etc. may be used to acquire data across substantially or all of web 12. In an exemplary embodiment, an overlap between a first image processing apparatus and a second image processing apparatus may be utilized. The overlap may be at least 0.1 inch, at least 0.5 inch, at least one inch, or any other distance. In another exemplary embodiment, no overlap may be utilized.

Stabilization may be necessary to reduce web 12 motion toward and away from image processing apparatus 36. This motion is termed web flutter. Web flutter may cause the image to sometimes be out of focus and may cause the magnification of the image to change. Web stabilizer 39 may be any mechanism that dampens the flutter of web 12 to within acceptable limits of depth-of-field for recording the printed image on web 12 by image processing apparatus 36, without causing the ink to smear. Web stabilizer 39 may be a non-invasive web stabilizer such as that disclosed in U.S. Pat. No. 4,913,049 entitled "Bernoulli Effect Web Stabilizer." A non-invasive stabilizer is one that does not make physical contact with web 12.

Reduction of rippling or corrugations in web 12 may also be necessary. Any ripples in web 12 can cause light and dark spots in the image obtained from web 12. These light and dark spots do not usually affect the determination of the location of the colorbar (or whatever other area of web 12 that is desired to be imaged), but they may adversely affect the color measurements of the image. One way to reduce these ripples in web 12 is to run web 12 over an idler, giving more support to web 12.

If web 12 is transparent or translucent, accurate optical density measurements may require that light reflected back through web 12 be minimized. This may be accomplished by providing a black backing behind web 12, providing a large open cavity behind web 12 such that little light will be reflected through web 12, or utilizing a black roller if web 12 is stabilized by imaging on a roller.

Image processing apparatus 36 and camera positioning unit 34 may be mounted on printing system 10 anywhere after the ink has been applied to web 12. For example, image processing apparatus 36 and camera positioning unit 34 may be mounted between the last printing unit (either printing unit 14, 16, 18, and 20) and the oven, directly after the oven, on the chill rolls, or after the chill rolls. If optical density measurements are required in the absence of other inks, or if the measurement is required immediately subsequent to printing, it may be advantageous to mount image processing apparatus 36 and camera positioning unit 34 between printing units 14, 16, 18, and 20.

Illumination system 38 may be in communication with computer 32 by a signal bus 52. Illumination system 38 may include a light source 42 (only one shown) and a focusing mechanism 44. Control signals from computer 32, corresponding to when a colorbar is within field of view 56, may be sent via signal bus 52 to indicate when web 12 should be illuminated by light source 42. Light source 42 may be a xenon strobe, however other types of light sources may also be used. For example, for applications with slower web speed, halogen bulbs may provide appropriate lighting.

In one embodiment, pulsed xenon strobe lights with a pulse duration of approximately one microsecond may be utilized. With a web speed of 3,500 feet per minute and a limitation of moving the colorbar (or sampled region) less than 0.003" during the illumination period, a five microsecond illumination time may be utilized to minimize the amount of movement of the printed image during the time image recording device 40 is quantifying the amount of incoming light reflected from web 12. By way of example, light source 42 may include a strobe light assembly utilizing strobes FX-1163 with coordinated 1100 series power supplies, available from Perkin-Elmer.

Alternatively, a line array of LEDs may be used as light source 42 for illuminating a portion of web 12. In such a case, the LEDs may be arranged along the width of web 12 such that an optical distributor may not be necessary. LEDs emitting white light may be employed, although other LEDs such as those emitting red, blue, or green light may be used, depending upon the sensors used and the type of image data required for the application. The LEDs may provide the option of pulsed operation.

Light may be delivered to web 12 (directly or indirectly from light source 42) at an angle of approximately 45 degrees from the reflected light traveling to lens. The use of LEDs as light source 42 may require the use of reflectors to focus the emitted light in an advantageous manner.

The illumination control signals from computer 32 may be produced, for example, by conventional means utilizing rotational position information generated from a sensor placed on one of blanket cylinders (22 or 26), knowledge of the speed of web 12, and knowledge of the distance between image recording device 40 and one of blanket cylinders (22 or 26).

Focusing mechanism 44 efficiently concentrates the light emitted from light source 42 onto the image within field of view 56. When the strobe light is flashed, image recording device 40 may record the image within field of view 56, which contains portions of the colorbars. In some embodiments, to reduce the effects of scattered light, the lighting could be modified such that only the colorbar is illuminated when measuring the spectra.

Figure 12A:
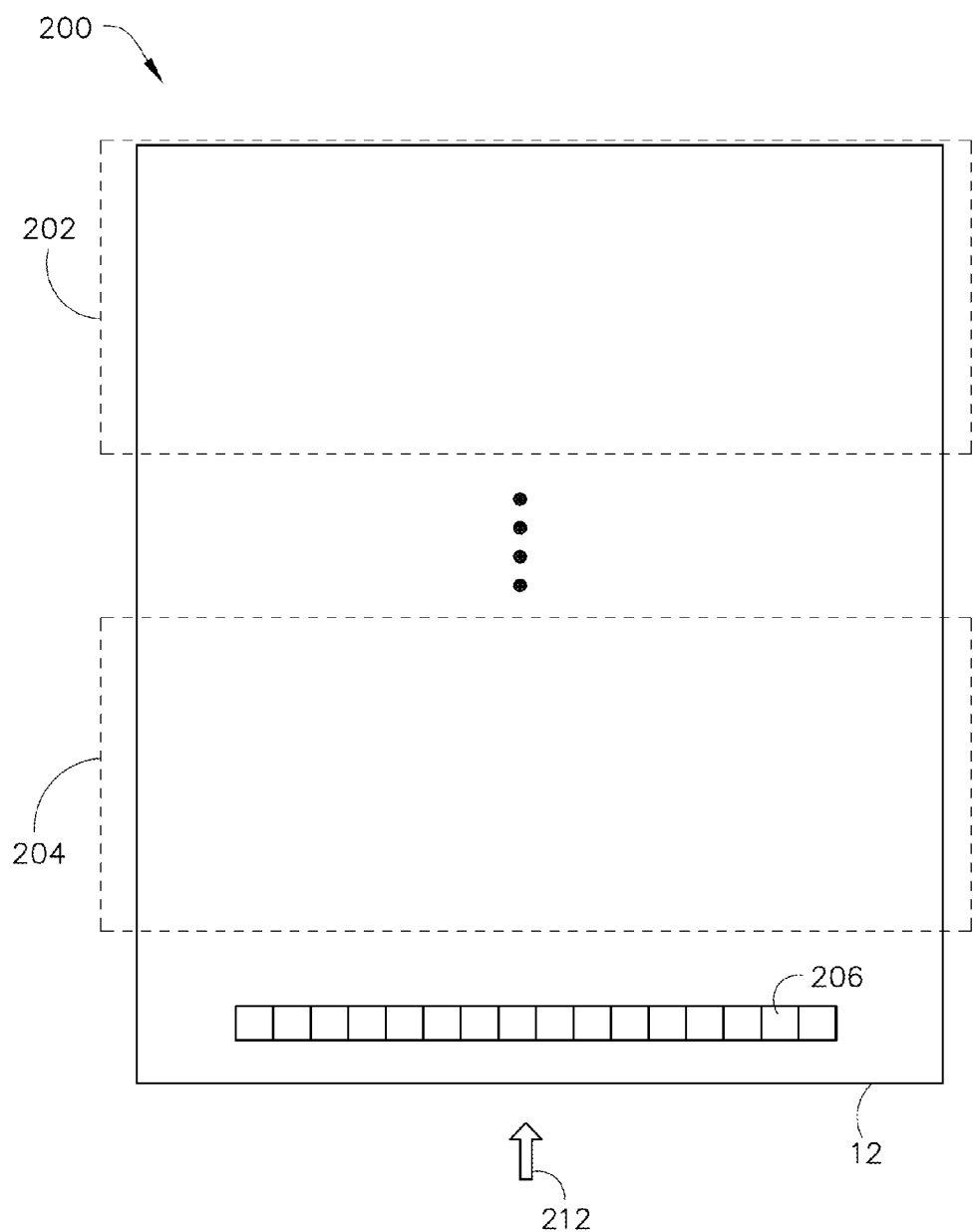
Figure 12C:
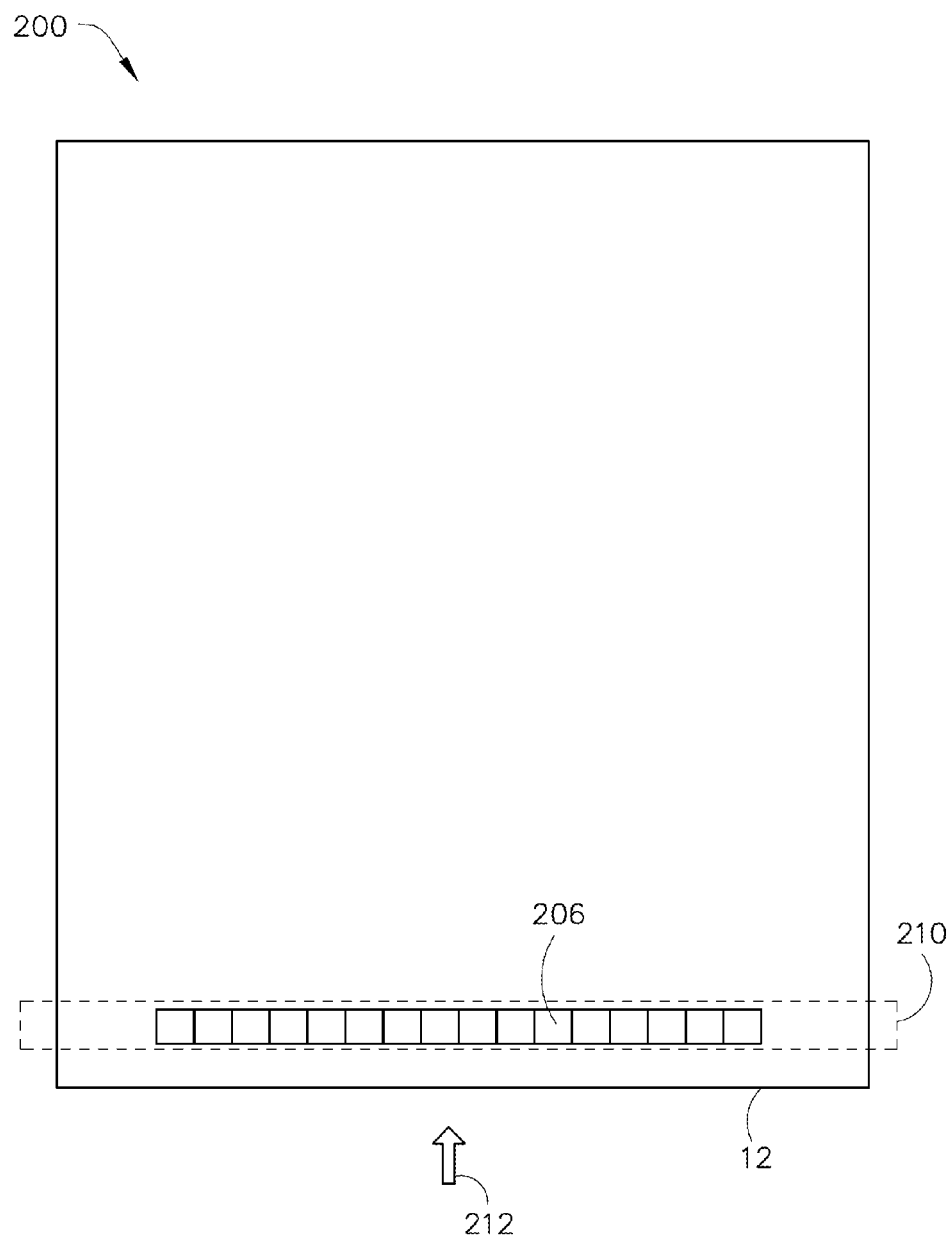

In FIGS. 12A-12C, a process of detecting a colorbar 206 and focusing light on colorbar 206 is shown, according to an exemplary embodiment. In this embodiment, web 12 may be moving in a direction 212 indicated by the arrow. In FIG. 12A, as web 12 moves a first area 202 may be illuminated by light source 42 to determine whether colorbar 206 is within first area 202. In this exemplary embodiment, the system may determine that colorbar 206 was not within first area 202. The system may illuminate a second area 204 to determine whether colorbar 206 is within second area 204. In this exemplary embodiment, the system may determine that colorbar 206 was not within second area 204. In FIG. 12B, the system may illuminate a third area 208 to determine whether colorbar 206 is within third area 208. In this exemplary embodiment, the system may determine that colorbar 206 was within third area 208. In FIG. 12C, based on determining that colorbar 206 was within third area 208, the system may focus the area of illumination to illuminate a fourth area 210. Fourth area 210 may be a smaller area then first area 202, second area 204 and/or third area 208. Fourth area 210 may comprise the area occupied by colorbar 206, a portion of the area occupied by colorbar 206, the area of colorbar 206 along with areas adjacent to colorbar 206, and/or a portion of the area occupied by colorbar 206 along with areas adjacent to colorbar 206. In one embodiment, a first camera (e.g., an RGB or other camera used for spatial processing) may be used to acquire image areas 202, 204, and 208, and a second camera (e.g., a spectrophotometer or other camera used for color processing) may be used to acquire image area 210.

Figure 3:
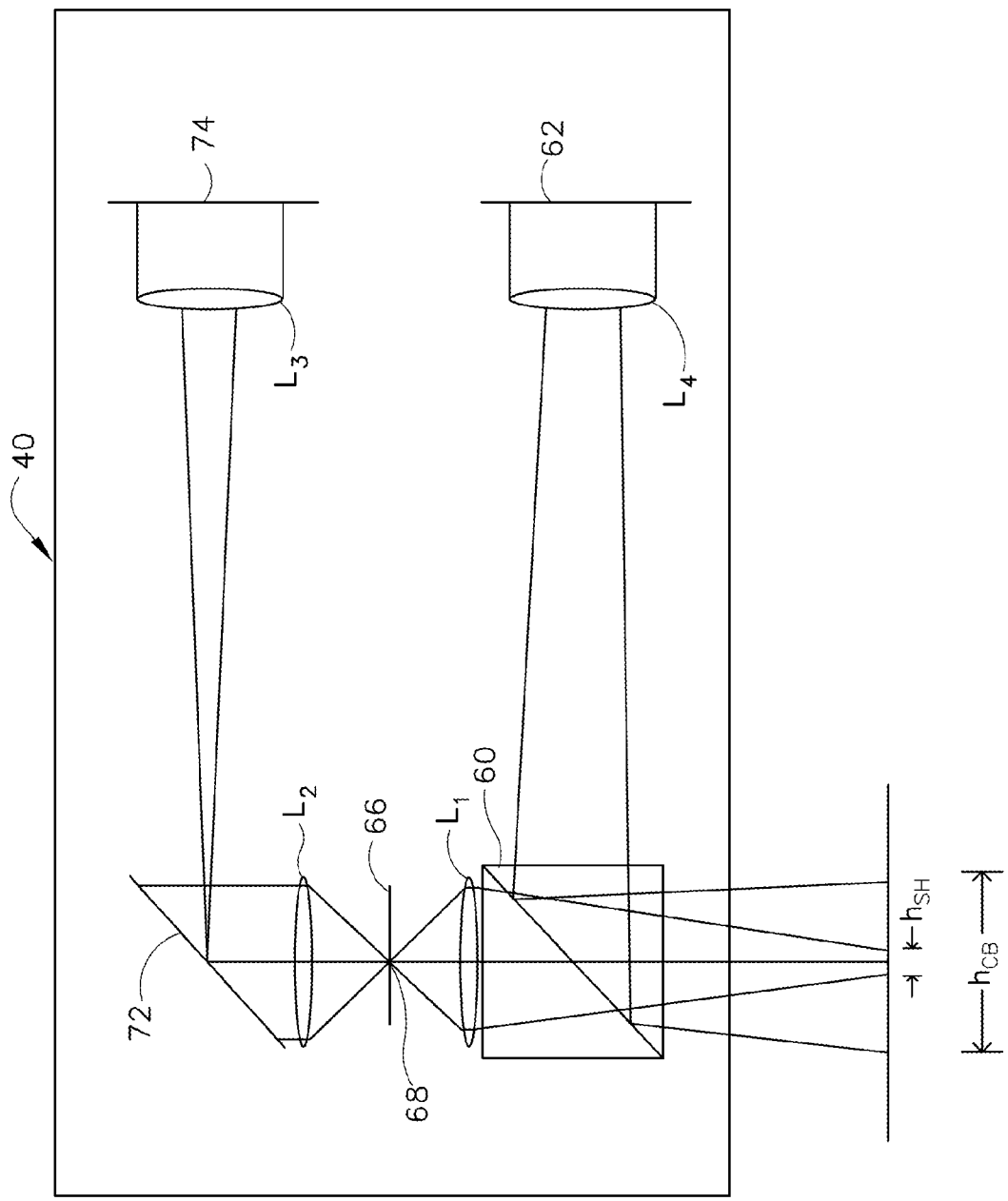
FIG. 3 is a schematic diagram of an image processing apparatus assembly, according to an exemplary embodiment.

Turning now to FIG. 3, image processing apparatus 36 is shown, according to an exemplary embodiment. Light may be reflected off of web 12 into image processing apparatus 36 and may be received by a beamsplitter 60. This reflected light may be the image acquired by image processing apparatus 36. Beamsplitters 60 of various reflection and transmission percentages may be used based on the overall efficiency of each path of optics. For example, if the spectral portion is less efficient than the spatial portion, beamsplitter 60 having a 30% reflectance and 70% transmittance may be used, where the transmitted portion of the beam progresses along the spectral path.

The acquired image represents a thin slice through multiple patches along colorbar 206. Referring to FIG. 13, an illustration of acquiring a portion of multiple patches along colorbar 206 is shown, according to an exemplary embodiment. A portion of multiple colorbar patches 214 may be a part of colorbar 206, a share of colorbar 206, a slice of colorbar 206, an area less than the whole area of colorbar 206, a segment of colorbar 206, a fragment of colorbar 206, etc. Portion of multiple colorbar patches 214 may be a spectral measurement strip and portion of multiple colorbar patches 214 may be acquired by spectral imaging device 74.

Colorbar 206 may comprises a colorbar length 220 and a colorbar width 222. Colorbar width 222 may be at least 1.0 millimeters, at least 1.25 millimeters, at least 1.56 millimeters, at least 1.75 millimeters, at least 2.0 millimeters, or any other size. Colorbar length 220 may be at least 10 millimeters, at least 20 millimeters, at least 25 millimeters, at least 30 millimeters, etc. Portion of multiple colorbar patches 214 may comprises a portion length 216 and a portion width 218. Portion width 218 may be less than or equaled to 0.25 millimeters, less than or equaled to 0.35 millimeters, less than or equaled to 0.5 millimeters, less than or equaled to 0.9 millimeters, less than or equaled to 1.25 millimeters, or any other size. Portion length 216 may be less than 10 millimeters, less than 20 millimeters, less than 25 millimeters, less then 30 millimeters, or any other size. In an exemplary embodiment, colorbar width 222 is 1.56 millimeters and portion width 218 is 0.5 millimeters. Spectral imaging device 74 may acquire spectral measurements from portion of multiple colorbar patches 214. Since the area of portion of multiple colorbar patches 214 is less than the area of colorbar 206, the spectral measurements received by spectral imaging device 74 is less (e.g., 32% less based on 0.5 millimeters divided by 1.56 millimeters) than that of the total spectral measurements that could have been received from the entire colorbar 206.

In an exemplary embodiment, utilizing spatial imaging device 62 may increase the amount of spectral measurements that may be utilized (e.g., to be utilized for color control or data reporting operations) in the printing operation. Spatial imaging device 62 may acquire data from the entire colorbar 206. Since spatial imaging device 62 may acquire data from the entire colorbar 206, data points acquired by spatial imaging device 62 may be some of the same data points acquired by spectral imaging device 74. These common data points may be utilized to spectrally calibrate spatial imaging device 62 based on the spectral measurements acquired from these common data points by spectral imaging device 74. For example, spatial imaging device 62 acquires a measurement of X−1 for common point Z and spectral imaging device 74 acquires a measurement of X for common point Z. In this example, spatial imaging device 62 measured a value of X−1 for common point Z and any other point (e.g., a point within the shared colorbar 206 area or a point within colorbar 206 that is not shared between spectral imaging device 74 and spatial imaging device 62) that has a value of X−1 would be updated (e.g., modified, calibrated, etc.) to a value of X.

Spatial imaging device 62 may comprise, an RGB sensor, including for example a three-chip RGB sensor or a single chip Bayer RGB sensor, an area or line CCD sensor, a complementary metal-oxide-semiconductor ("CMOS") sensor, or other type of sensor. In an exemplary embodiment, Bayer RGB sensor may comprises a filter pattern which is fifty percent green, twenty-five percent red, and twenty-five percent blue. Spatial imaging device 62 may further comprise other features such as lens, an illumination system, processing circuits, converter circuits, etc. and may be used to create a camera or other imaging device. Spectral imaging device 74 may comprise a colorimeter, a spectral dispersion device such as a spectrometer, prism, reflective grating, transmissive grating or the like, or a spectrophotometer. One example of a spectral dispersion device is an ImSpector that is available from Spectral Imaging LTD, Oulu, Finland. The spectral imaging device 74 may further comprise other features such as a lens, an illumination system, processing circuits, converter circuits, etc. and may be used to create a camera or other imaging device. An RGB camera may comprise three channels, each channel configured to sense light in a predetermined range of wavelengths (e.g., red, green, and blue).

Spectral imaging device 74 may alternatively be a device that translates incoming light into spectral measurements, which can be done at a multiplicity of spatial locations. A spectral measurement may be a measurement of light at a multiplicity of wavelengths. The wavelengths can be measured in at least five channels, at least eight channels, at least twelve channels, at least twenty-four channels, at least thirty-two channels, etc. In one embodiment, spectral imaging device 74 may comprise a spectral dispersion device and a CCD sensor, such as a black and white two-dimensional CCD sensor. In another embodiment, spectral imaging device 74 may comprise a spatial dispersion device to split incoming light into a multiplicity of beams. Each of these beams of light may pass through one or more filters so as to pass a certain range of wavelengths. The filtered beams of light may then be projected onto a sensor (such as a linear CCD or other sensor) so that the light may be measured within that certain range of wavelengths.

In an exemplary embodiment, an RGB-based spatial imaging device 62 may be used to image the entire colorbar patch and a fraction of the pixels in the RGB spatial imaging device 62 have a corresponding measurement made by spectral imaging device 74. This area where the images of both the spatial and spectral imaging devices overlap may be used as a calibration area to calibrate the RGB pixels with respect to the spectral measurements. This calibration then may be extended to spatial imaging device's 62 other pixels that fall within the patch. Calibrating spatial imaging device 62 may be implemented by adjusting the averaged spectrum measured by spectral imaging device 74 by the difference measured between the pixels outside portion of multiple colorbar patches 214 and the pixels inside portion of multiple colorbar patches 214. The system may determine (e.g., calculates, predefines, etc.) that colorbar 206 has a relatively consistent density and CIEL*a*b* (e.g., which is a color space specified by the International Commission on Illumination) values. Since the system determines that colorbar 206 has relatively consistent density and CIEL*a*b* values, the system may need to adjust the spectrum based on a difference between pixels measured within portion of multiple colorbar patches 214 and the pixels measured outside of portion of multiple colorbar patches 214. The adjustment to the spectrum may be implemented utilizing three color bands (e.g., red, blue, and green) measured by spatial imaging device 62. For example, if the pixels outside of portion of multiple colorbar patches 214 are more red, less blue and acceptable green, then the spectrum may be adjusted higher on the red, adjusted lower on the blue and remain unchanged on the green. In this example, the percentage of colorbar 206 utilized to calculate the colorimetry (e.g., XYZ) and the density would increase from 32 percent to approximately 100 percent.

In FIG. 16, a flowchart of calibrating a spatial imaging device based on calibration data from a spectral imaging device 500 is shown, according to an exemplary embodiment. Spatial imaging device 62 acquires data points from at least a portion of colorbar 206 area (step 502). Spectral imaging device 74 acquires data points from at least a portion of colorbar 206 area (step 504). The data points acquired by spatial imaging device 62 are compared to data points acquired by spectral imaging device 74 (step 506). A processor in spatial imaging device 62, spectral imaging device 74, and/or a separate processor determines whether one data point from spatial imaging device 62 and spectral imaging device 74 are a shared data point (step 508). If there is no shared data point, then the process returns to step 502. If there is a shared data point, then the process moves to step 510. The processor in spatial imaging device 62, spectral imaging device 74, and/or the separate processor calibrates spatial imaging device 62 based on calibration data from spectral imaging device 74 (step 510). Alternatively, color data from spatial imaging device 62 may be used to calibrate spectral imaging device 74 in a similar manner. In another embodiment, spatial data from spatial imaging device 62 may be used to register spectral imaging device 74 in a similar manner.

In FIG. 17, a flowchart for controlling color in a printing operation and reporting out data including color space data and density data 600 is shown, according to an exemplary embodiment. The color control and reporting system is initiated (step 602). The color control and reporting system acquires image data from web 12 or substrate (step 604). The color control and reporting system determines density values (step 606). The color control and reporting system determines color space (e.g., CIE 1931 XYZ, Adobe RGB, sRGB, Adobe Wide Gamut RGB, CIEL*u*v*, CIEU*v*w*, CIEL*a*b*, etc.) values (step 608). The color control and reporting system determines whether density values are to be reported (step 610). If density values are to be reported, then the color control and reporting system transmits density values (step 612). The color control and reporting system determines whether color space values are to be reported (step 614). If color space values are to be reported, then the color control and reporting system transmits color space values (step 616). The color control and reporting system determines whether to control color based on color space values (step 618). If color control is to be based on color space values, then the color control and reporting system controls color based on color space values (step 620). For example, control signals may be provided to ink keys of printing units for printing colors on the substrate. If color control is not to be based on color space values, then the color control and reporting system moves to step 622. The color control and reporting system determines whether to control color based on density values (step 622). If color control is to be based on density values, then the color control and reporting system controls color based on density values (step 624). If color control is not to be based on density values, then the process moves back to step 604.

As illustrated in FIG. 3, a portion (i.e. a beam) of the acquired image is diverted by beamsplitter 60 to a first imaging device. In the illustrated embodiment, the first imaging device is spatial imaging device 62. Spatial imaging device 62 may process the spatial information from the acquired image. The spatial information conveys where on web 12 the data is coming from.

Referring to FIG. 3, another portion of the same acquired image passes through beamsplitter 60 to the focusing lens $L_1$. From the lens $L_1$, the image travels to an internal light blocker 66 having a slit 68 therein. Internal light blocker 66 is located inside of image recording device 40. Internal light blocker 66 may be made of any material that prevents light from passing therethrough. In the illustrated embodiment, internal light blocker 66 is made of aluminum having a thickness of approximately ten microns. Internal light blocker 66 may be darkened or black anodized to reduce the incidence of reflected light off of internal light blocker 66. The slit height and magnification of lens $L_1$ are chosen such that in the vertical direction (the short dimension of colorbar 206), approximately one-half of the image of colorbar 206 is transmitted through slit 68. Internal light blocker 66 may allow for circumferential movement (i.e., how much the image "moves" from sample to sample) of +/−¼ of colorbar 206 height. The length of slit 68 may be chosen such that several colorbar 206 patches (i.e., at least two, at least four, at least eight, at least ten, etc.) go through slit 68. The size of slit 68 assures that only light from the reflected colorbar 206 passes through slit 68, even if the image is not centered on slit 68. The lens $L_1$ focuses the acquired image onto slit 68.

From slit 68, light travels to a collimating lens $L_2$. The lens $L_2$ transmits light as a parallel beam to a ruled diffraction grating 72. It is understood that a transmission-type diffraction grating may also be used. It is also understood that a prism 86 may be used instead of diffraction grating 72 as the dispersing element. A system utilizing prism 86 is described in more detail below with respect to FIG. 9. Diffraction grating 72 disperses light into its spectral components along a known angular spread.

Diffraction gratings 72 may be designed to have higher efficiencies at particular frequencies, but have non-zero efficiency over a very wide range. For example, part number F43-742 from Edmund Optics has 600 lines/mm and is optimized to have maximum efficiency at 500 nanometers. However, this diffraction grating 72 has significant efficiency from about 300 nanometers to 1,200 nanometers. Light of multiple frequencies may also be diffracted at the same angle. For example, light at 800 nanometers is first-order diffracted at the same angle as the second-order diffraction of 400 nanometers, and the third order diffraction of 267 nanometers. If overlapping spectra are not desired, a cutoff filters 71 (FIG. 4) that block light of the wavelengths not of interest should be inserted in the optical path before diffraction grating 72. In the illustrated embodiment, the system may be interested in light between about 400 nanometers and about 700 nanometers such that cutoff filters 71 may be inserted before diffraction grating 72 to block all light above 700 nanometers and below 400 nanometers.

In the illustrated embodiment, the angular spread of light between about 400 nanometers and 700 nanometers is approximately 12°. This dispersion occurs in the vertical dimension (with reference to FIG. 5). A focusing lens $L_3$ focuses the dispersed light onto a second imaging device, where it is captured. In the illustrated embodiment, the second imaging device is spectral imaging device 74. Spectral imaging device 74 may process the spectral information from the acquired image.

Figure 4:
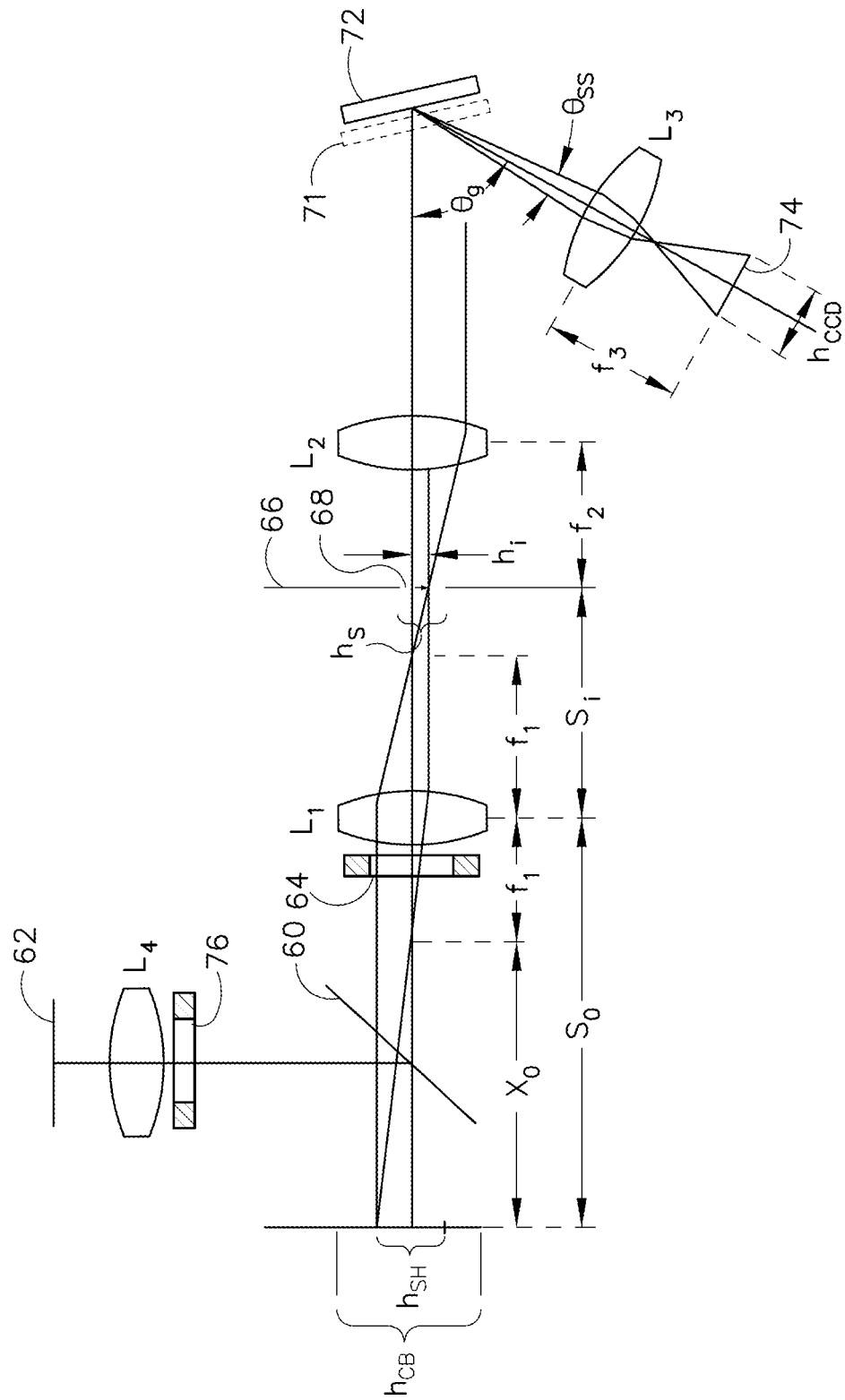
FIG. 4 is a more detailed schematic of the diagram of FIG. 3, according to an exemplary embodiment.

FIG. 4 illustrates in more detail the optics of image processing apparatus 36 described above with respect to FIG. 3. As illustrated, the portion of the beam transmitted through beamsplitter 60 to the spatial components travels through an aperture 76 (to help limit the amount of incidental light and to help control the amount of aberrations) and through a lens $L_4$ onto spatial imaging device 62. The magnification of the spatial components may be such that the light fits across spatial imaging device 62. The lens $L_4$ may be placed such that spatial imaging device 62 is at the focal length $f_4$ of lens $L_4$.

In an exemplary embodiment, image processing apparatus 36 may include a lens $L_3$, a lens $L_4$, aperture 76, spatial imaging device 62, spectral imaging device 74, and/or internal light blocker 66 inside of a housing.

The following process may be used to determine the proper optical placement of the spectral components (i.e. the proper focal lengths of the lenses, as well as the proper position of slit 68) within imaging processing apparatus 36 and to get the spectral spread to fit across spectral imaging device 74. In an exemplary embodiment, the process begins at the end (i.e. spectral imaging device 74) and work back to colorbar 206. First, the focal length $f_3$ of the lens $L_3$ is determined. This is dependent on the amount of spectral spread $\theta^{ss}$ off of diffraction grating 72. If spectral imaging device 74 has a height $h_{CCD}$, then $\tan(\theta_{SS}/2)=h_{CCD}/2f_3$. Thus, in order for the spectra to fit on the spectral CCD, $[f_3 \leq h_{CCD}/2 \tan(\theta_{SS}/2)]$ The spectral spread $\theta_{SS}$ is determined by the line spacing of diffraction grating 72, and the wavelengths of the light of interest. In the illustrated embodiment, diffraction grating 72 may be used which has 600 lines/mm. The grating equation is $m\lambda = d(\sin\theta_m - \sin\theta_i)$, where m=the diffraction order, d=the groove spacing of diffraction grating 72, $\theta_m$=the diffraction angle for order m, and $\theta_i$=the incident angle of the light (e.g. the blaze angle, which is 8.6° in the illustrated embodiment).

For a blazed diffraction grating with blaze angle $\theta_b$, the diffracted light efficiency is maximized when $\theta_i=\theta_b$. If wavelengths from $\lambda_1=400$ nanometers to $\lambda_2=700$ nanometers are of interest (which approximately covers the range of visible light), and d=1/600 lines/mm=1,667 nanometers, then for the first order diffraction (which may be used because it has the highest strength of reflected light):
400 nanometers=1667 nanometers (sin $\theta_{m1}$−sin(8.6°))
700 nanometers=1667 nanometers (sin $\theta_{m2}$−sin(8.6°))
Therefore, $\theta_{m1}=22.9°$ and $\theta_{m2}=34.7°$. Thus, the spectral spread is $\theta_{ss}=34.7°-22.9°$ or $\theta_{ss}=11.8°$.

Spectral imaging device 74 may be placed a distance from the lens $L_3$ equal to the focal length $f_3$. In the spatial dimension, diffraction grating 72 may act as a mirror.

If the slit height is $h_s=0.1$ mm, and 10 nanometers spectral resolution (or 36 bins) is desired, this equates to the zero-order slit width on spectral imaging device 74 having a height of $h_{CCD}/36$. Calculating spectral resolution based on the zero-order slit width is an approximation, since the light through the slit has a non-uniform profile. Thus, the lens $L_3$ and the lens $L_2$ need a combined magnification of $|M_{23}|\leq h_{CCD}/[(0.1 \text{ mm})(36)]$. $|M_{23}|=f_3/f_2$, where $f_2$ is the focal length of the lens $L_2$. Thus, $f_3/f_2\leq h_{CCD}/3.6$ mm and $f_2\geq 3.6 f_3/h_{CCD}$.

If the sampled height of the colorbar $h_{sh}$ is to be magnified to the slit height $h_s$, slit 68 may be placed at the image position $s_i$ of the lens $L_1$ (to focus the image on slit 68) and at a distance equal to the focal length $f_2$ of the lens $L_2$ (to collimate the light). If $h_{sh}=0.8$ mm (or approximately {fraction (1/32)}inch), and $h_s=0.1$ mm, then the lens $L_1$ may be magnify by $|M_1|=0.125$. But, we also need the spatial dimension to fit across spatial imaging device 62.

Plugging in some values, let $h_{CCD}=4.36$ mm. Then $f_3\leq 4.36$ mm/$[2 \tan(11.8°/2)]$ and $f_3\leq 18.0$ mm. So, let $f_3=14$ mm. Then, $f_2\leq(3.6$ mm$)(14$ mm$)/4.36$ mm and $f_2\geq 11.6$ mm. If 25 mm is to spatially fit across spatial imaging device 62, the overall magnification $|M_{123}|$ may be $|M_{123}|=4.36$ mm/25 mm and $|M_{123}|=0.174$. If $|M_1|=0.125$, then we need $|M_{123}|\leq 0.39$, $f_3, f_2$23 1.39, $f_2\geq(14$ mm$)/(1.39)$ and $f_2\geq 10.1$ mm.

The above calculations represent two constraints on the focal length $f_2$ such that a focal length should be chosen that satisfies both constraints. So, let $f_2=12.0$ mm.

The image height hi (i.e. the slit width) at the focal point of the lens $L_2$ may determine the spectral resolution in image processing apparatus 36. If 36 bins of spectral resolution are desired, then the light incident on diffraction grating 72 may be within $\theta_{SS}/36$ or $13°/36=0.361°$.

Finally, to calculate the focal length $f_1$ of the lens $L_1$, $|M_1|=f_1/x_o=0.125$ (where $x_o$ is a variable that equals the distance from the object to the focal point of the lens $L_1$) and $x_o=100$ mm, then $f_1=12.5$ mm. So we have $f_1=12.5$ mm, $f_2=12.0$ mm, and $f_3=14.0$ mm.

As described, image recording device 40 of the present disclosure may include both spatial imaging device 62 and spectral imaging device 74. Image processing apparatus 36 as illustrated may process both the spatial and spectral information from the same acquired image (i.e. acquired from the same position on web 12 at the same time). The spatial and spectral images, taken together, allow the press operators to analyze the print quality of the image and make adjustments, where necessary. This system allows for improved color control of printed web 12 in that image processing apparatus 36 may measure the spectral response of colorbar patches within colorbar 206 with very fine spectral resolution. This makes it easier to match the densitometric and colorimetric filters for measuring color to image processing apparatus 36.

Figure 5:
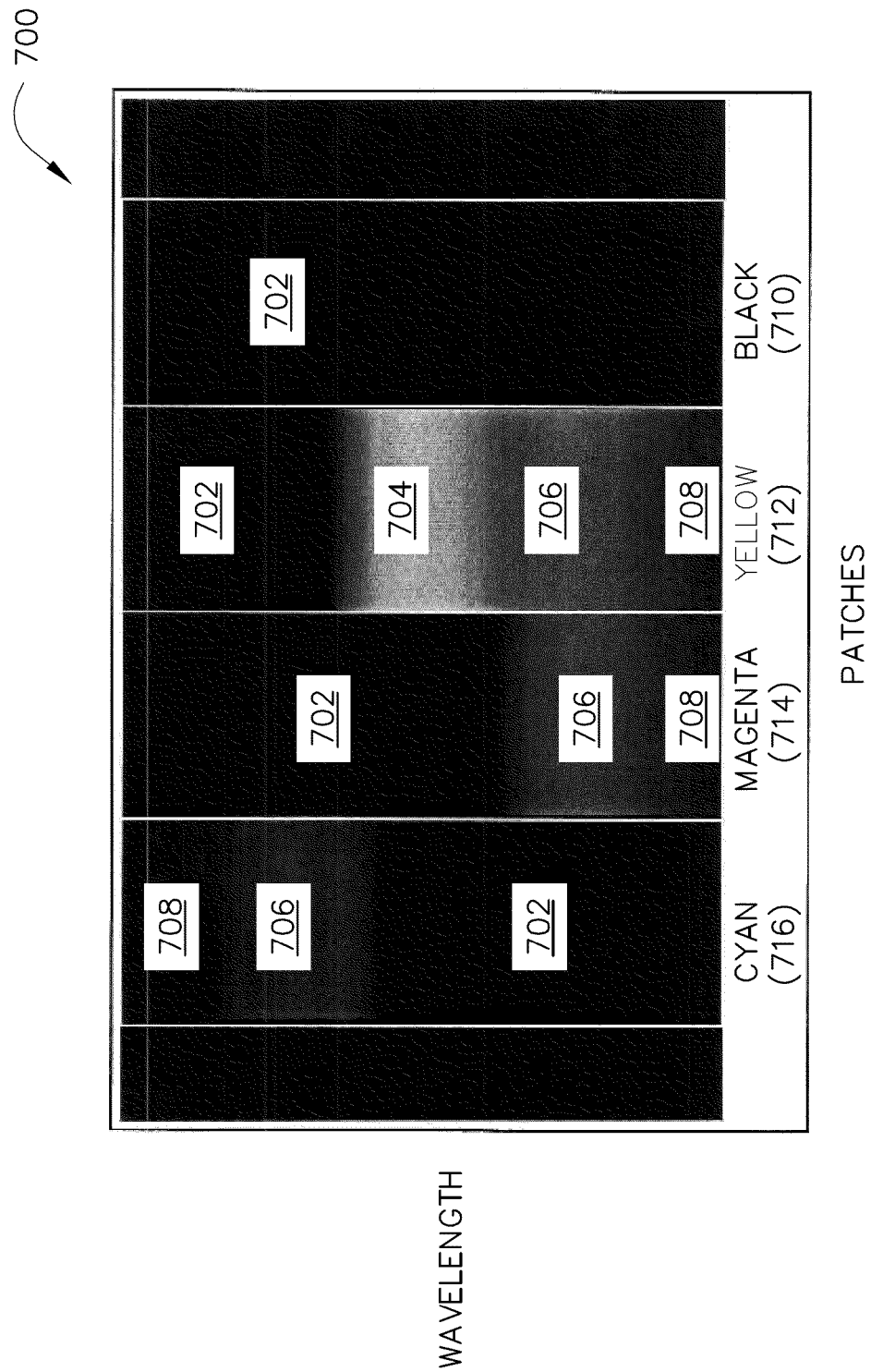
FIG. 5 illustrates the captured image taken through the colorbar patches of a printed image, according to an exemplary embodiment.

FIG. 5 illustrates the spectral and spatial information generated using image processing apparatus 36, according to an exemplary embodiment. A spectral matrix 700 comprises a black column 710, a yellow column 712, a magenta column 714, and a cyan column 716 representing the spectral response of an image of a black color patch, a yellow color patch, a magenta color patch, and a cyan color patch. In an exemplary embodiment, black column 710 comprises an area which has a minimal spectral response area 702. In this exemplary embodiment, all or substantially all of the area for black column 710 comprises minimal spectral response area 702. In an exemplary embodiment, yellow column 712 comprises at least four areas. These four areas are minimal spectral response area 702, a high spectral response area 704, a medium spectral response area 706, and a low spectral response area 708. In an exemplary embodiment, magenta column 714 comprises at least three areas. These three areas are minimal spectral response area 702, medium response area 706, and low spectral response area 708. In an exemplary embodiment, cyan column 716 comprises at least three areas. These three areas are minimal spectral response area 702, medium spectral response area 706, and low spectral response area 708. As illustrated, the spatial information may be measured along the horizontal axis and the spectral information along the vertical axis. Using this information, the print quality of the printed substrate may be monitored and adjusted as necessary. Light having a wavelength of approximately 400 nanometers may be located near the top of the image and light of approximately 700 nanometers may be located near the bottom of the image.

Figure 14A:
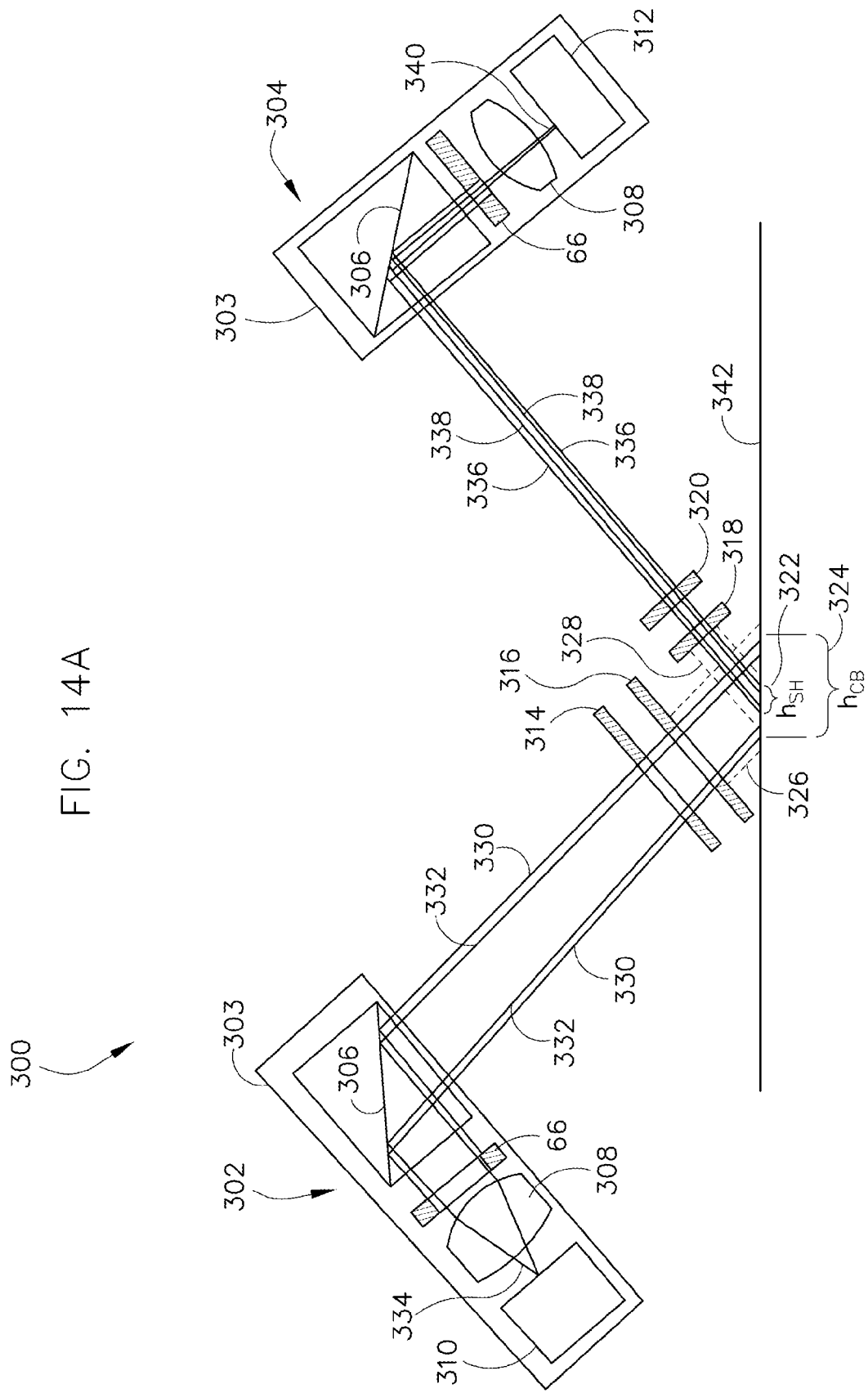
FIGS. 14A-14C are illustrations of a spatial imaging device and a spectral imaging device acquiring image data from a printed image, according to exemplary embodiments.
Figure 14B:
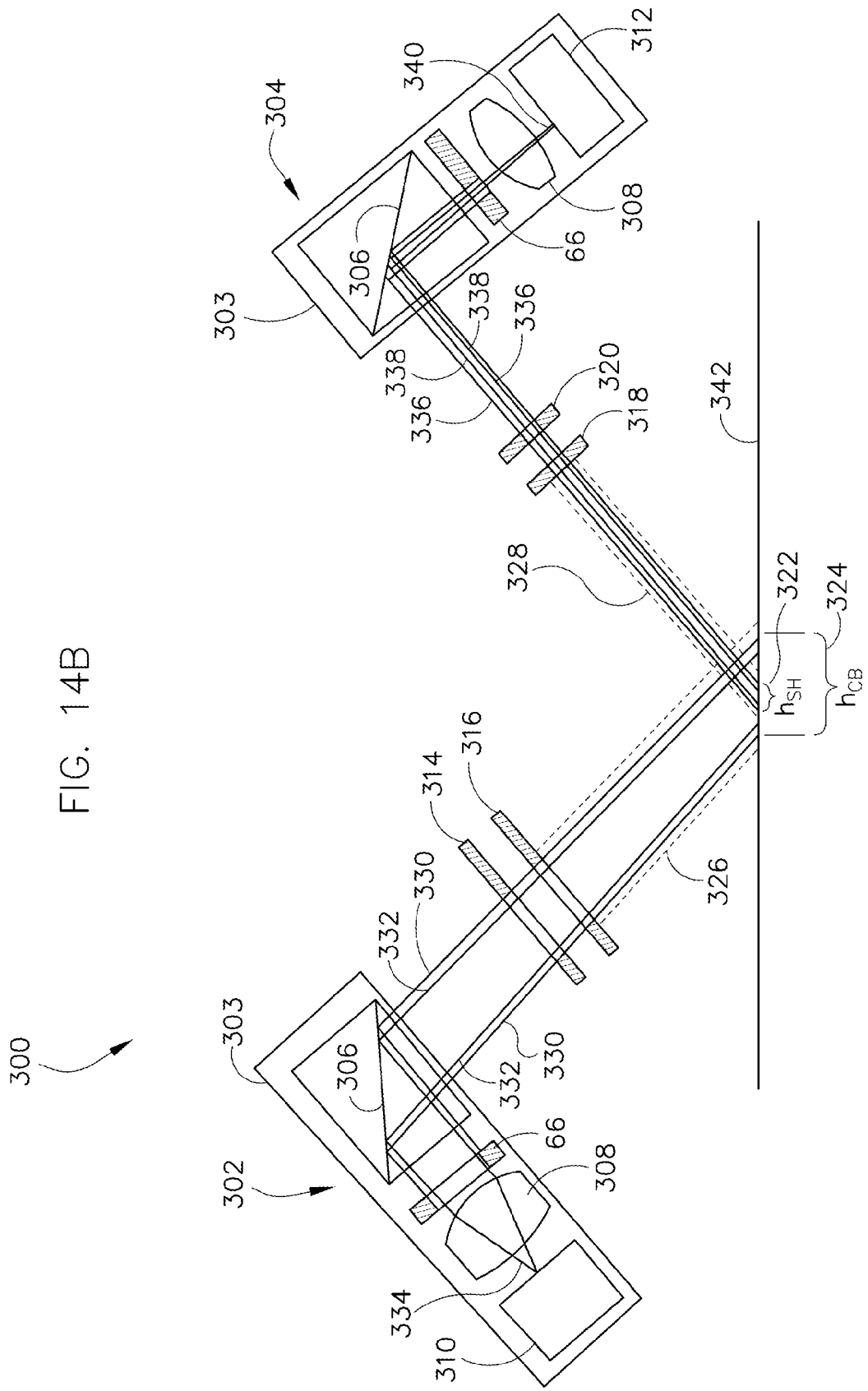
Figure 14C:
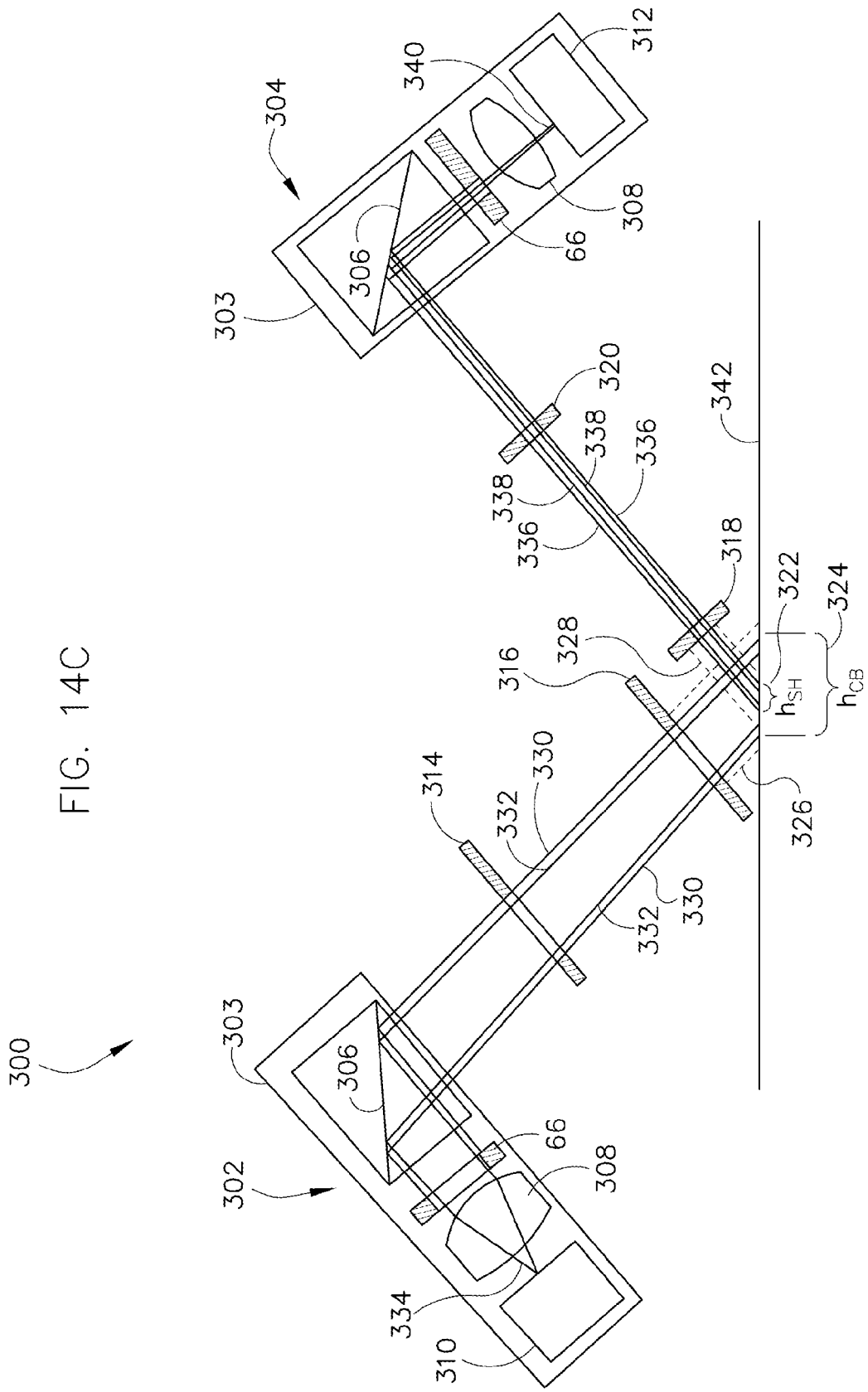
Figure 15A:
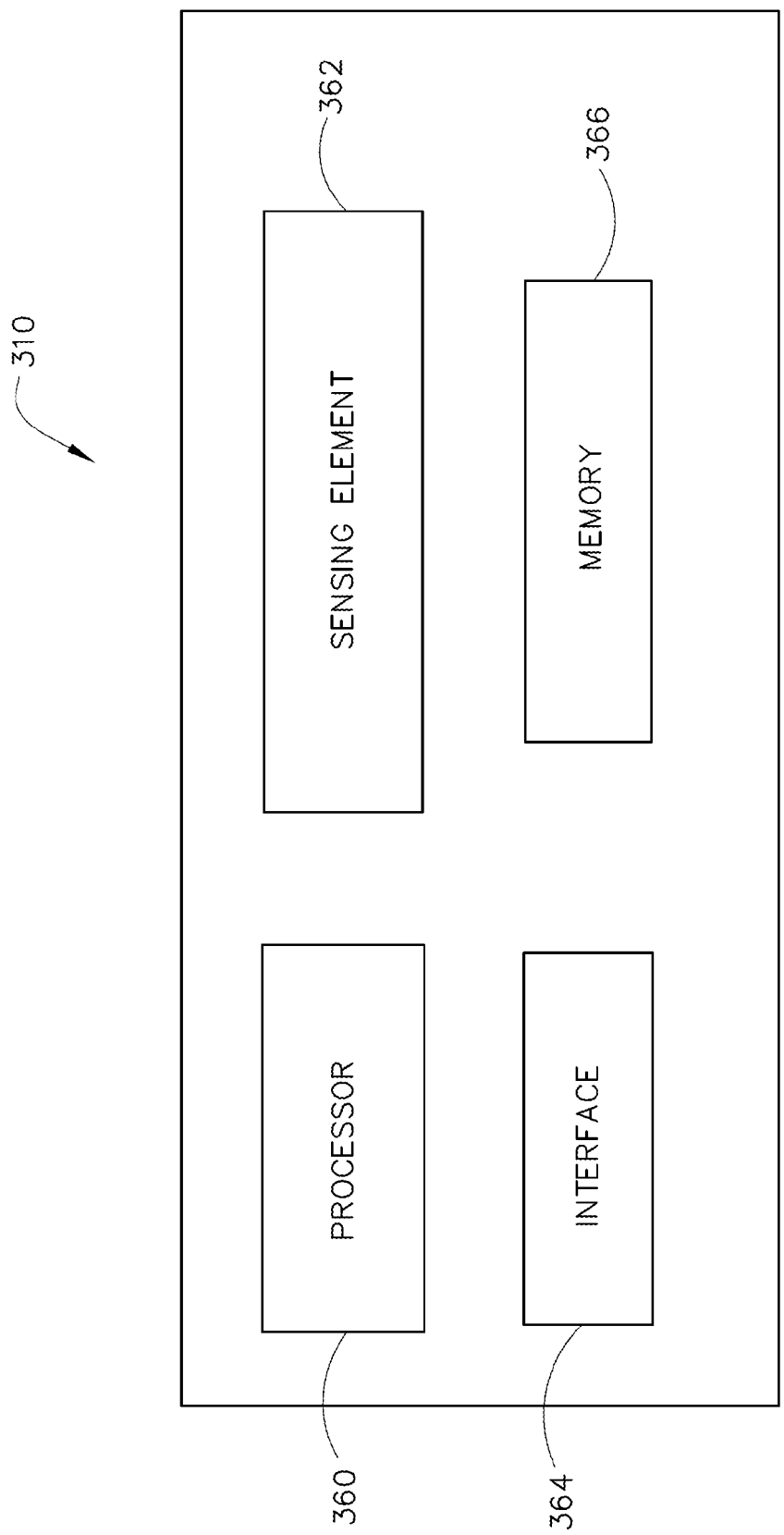
FIGS. 15A-15B are block diagrams of a first imaging unit and a second imaging unit, according to exemplary embodiments.
Figure 15B:
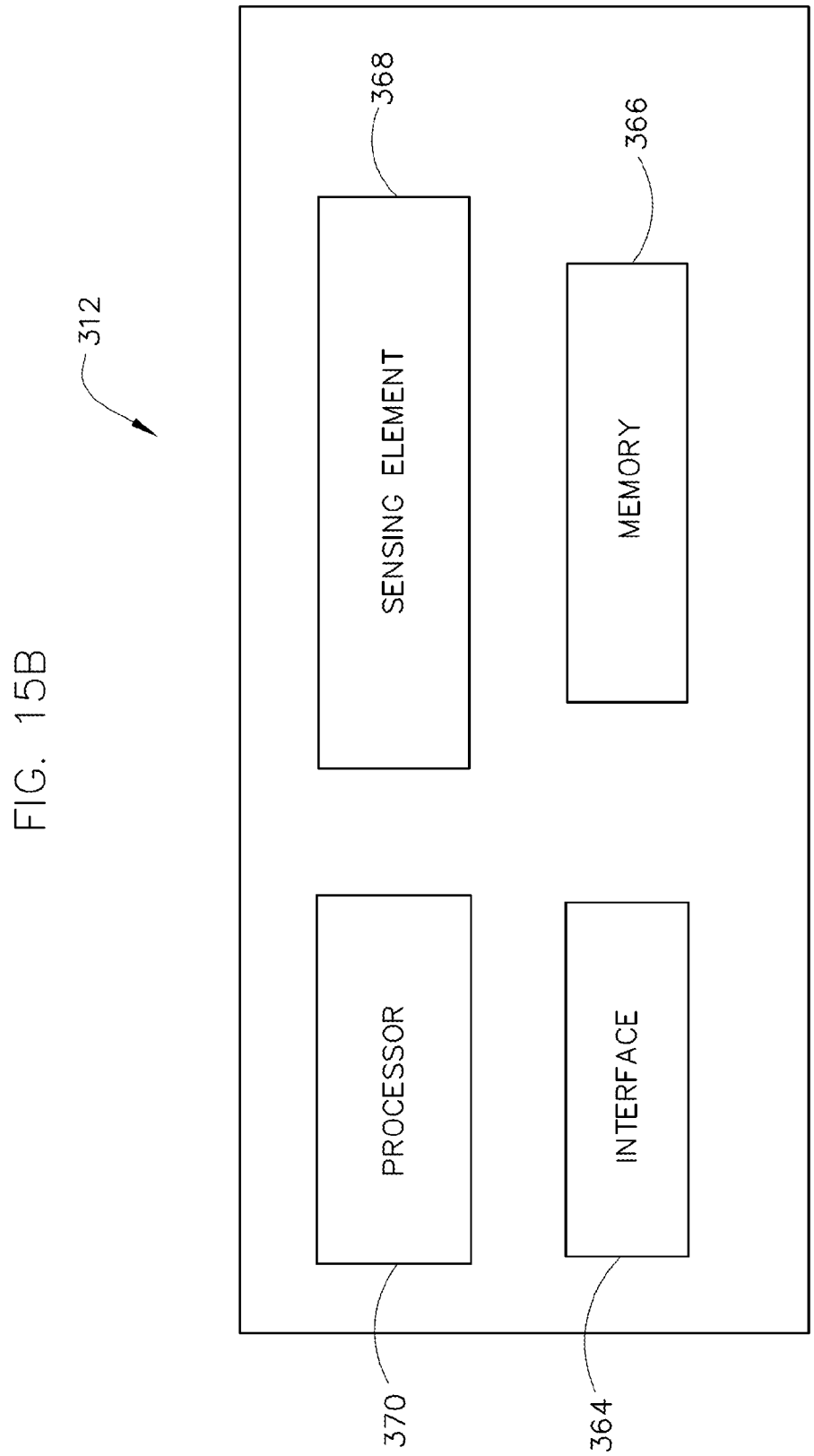

In FIGS. 14A-14C, illustrations of a spatial imaging device 302 and a spectral imaging device 304 acquiring image data from a printed image 342 are shown, according to exemplary embodiments. Spatial imaging device 302 may comprise a light reflector 306, internal light blocker 66, a lens 308, and/or a first imaging unit 310 within a housing 303. First imaging unit 310 may process spatial data and/or spectral data. Referring to FIG. 15A, first imaging unit 310 may comprise a first sensing element 362, a memory 366, a first processor 360, an interface 364 and/or any combination thereof Spectral imaging device 304 may comprise light reflector 306, internal light blocker 66, lens 308, and/or a second imaging unit 312 in housing 303. Second imaging unit 312 may process spatial data and/or spectral data. Referring to FIG. 15B, second imaging unit 312 may comprise a second sensing element 368, memory 366, a second processor 370, interface 364 and/or any combination thereof.

In an exemplary embodiment, spatial imaging device 302 may acquire a first light 330 and a second light 332 from a colorbar area 324. A third light 326 may not be acquired by spatial imaging device 302 because third light 326 may be blocked by a first external light blocker 316 and/or a second external light blocker 314. First light 330 and second light 332 may be reflected off of reflector 306 to internal light blocker 66. Internal light blocker 66 may block first light 330 and allow second light 332 to be transmitted to lens 308 based on spectral frequency, scattered light criteria, lens 308 characteristics, first imaging unit 310 characteristics, and/or any combination thereof. Lens 308 focuses and/or collimates second light 332 into a fourth light 334 which may be transmitted to first imaging unit 310. In alternative embodiments, first light 330 and second light 332 are transmitted directly to internal light blocker 66, lens 308 and/or first imaging unit 310.

In an exemplary embodiment, spectral imaging device 304 may acquire a fifth light 336 and a sixth light 338 from a portion of colorbar area 322. A seventh light 328 may be blocked by a third external light blocker 318 and/or a fourth external light blocker 320. Fifth light 336 and sixth light 338 may be reflected off of reflector 306 to internal light blocker 66. Internal light blocker 66 may block fifth light 336 and allow sixth light 338 to be transmitted to lens 308 based on spectral frequency, scattered light criteria, lens 308 characteristics, second imaging unit 312 characteristics, and/or any combination thereof. Lens 308 focuses and/or collimates sixth light 338 into a seventh light 340 which may be transmitted to second imaging unit 312. In alternative embodiments, fifth light 336 and sixth light 338 are transmitted directly to internal light blocker 66, lens 308 and/or second imaging unit 312. It should be noted that first external light blocker 316, second external light blocker 314, third external light blocker 318 and/or a fourth external light blocker 320 may be positioned outside of housing 303.

In FIG. 14B, the system shown in FIG. 14A is illustrated with first external light blocker 316, second external light blocker 314, third external light blocker 318, and fourth external light blocker 320 positioned closer to spatial imaging device 302 and spectral imaging device 304, respectively. In FIG. 14C, the system shown in FIG. 14A is illustrated with the distance between first external light blocker 316 and second external light blocker 314 increasing and the distance between third external light blocker 318 and fourth external light blocker 320 increasing. It should be noted that the positions of first external light blocker 316, second external light blocker 314, third external light blocker 318, and/or fourth external light blocker 320 may be increased or decreased in relation to printed image 342, spectral imaging device 302, spatial imaging device 302, or each other.

Figure 6:
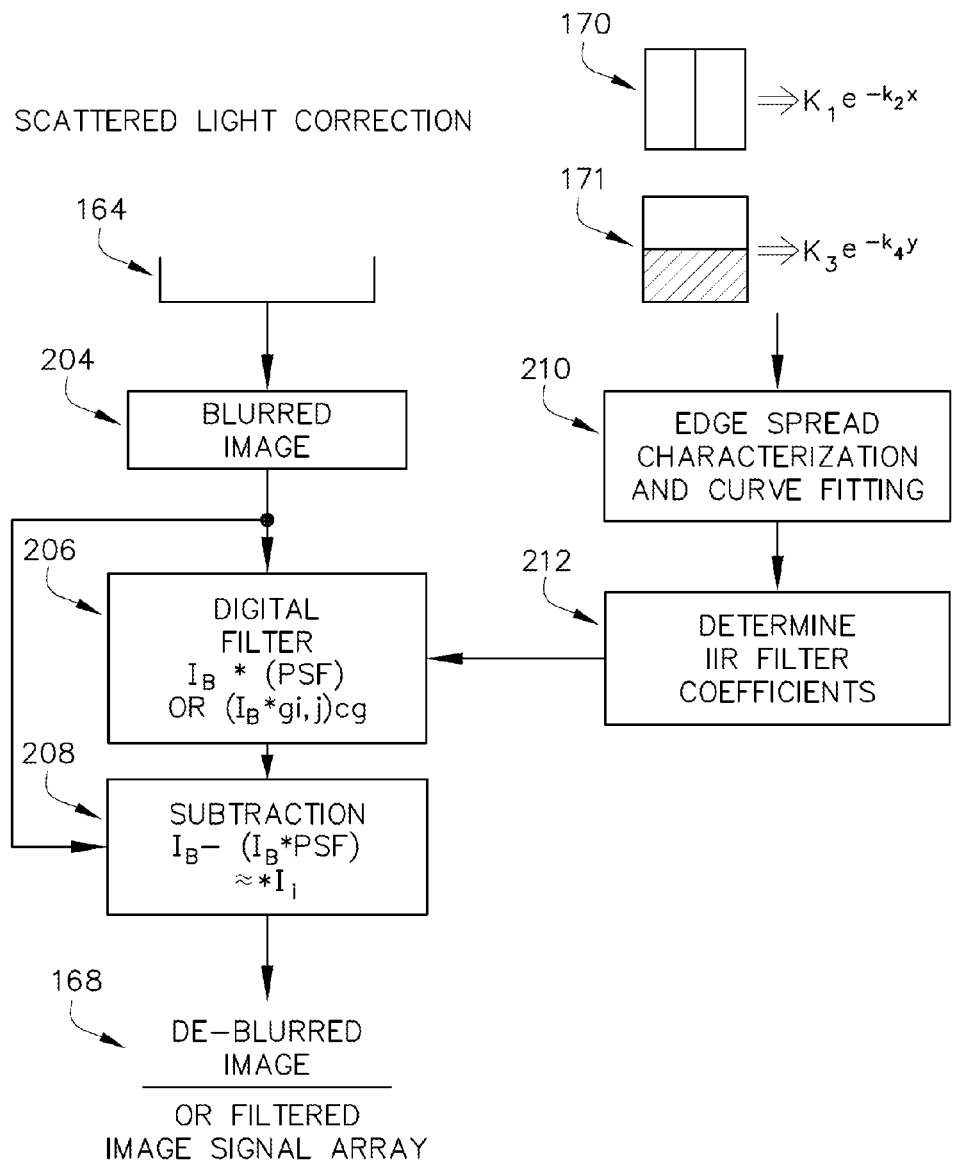
FIG. 6 is a flow chart of a scattered light correction process, according to an exemplary embodiment.

Scattered light may be an issue in systems for measuring color quality because scattered light affects the accuracy of the color measurement of the printed substrate. One solution to scattered light problems in systems for measuring color is described in U.S. Pat. No. 5,724,259, the entire contents of which is incorporated herein by reference. FIG. 6 illustrates a flow chart of this scattered light correction process. Another solution to the scattered light issue may be to adjust the optics and/or illumination of web 12 to reduce the effects of scattered light.

Figure 7:
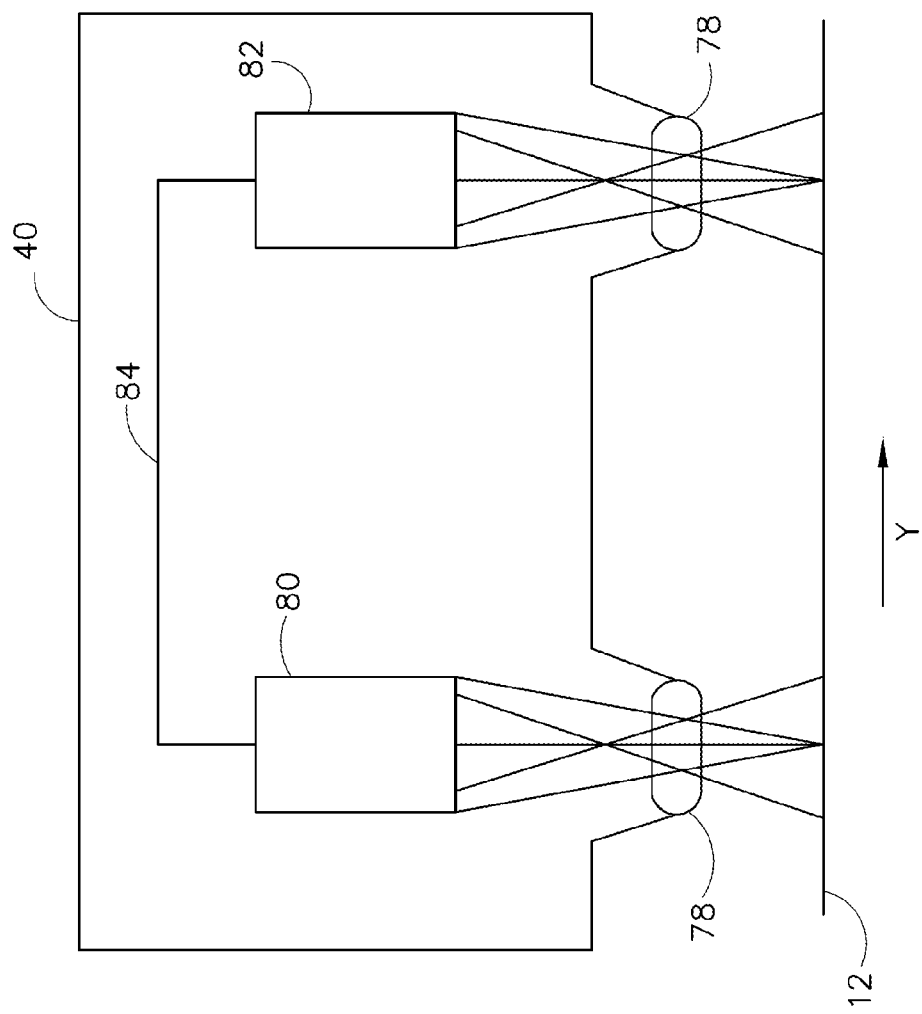
FIG. 7 is a schematic diagram of the optics of the image processing apparatus, according to an exemplary embodiment.
Figure 8:
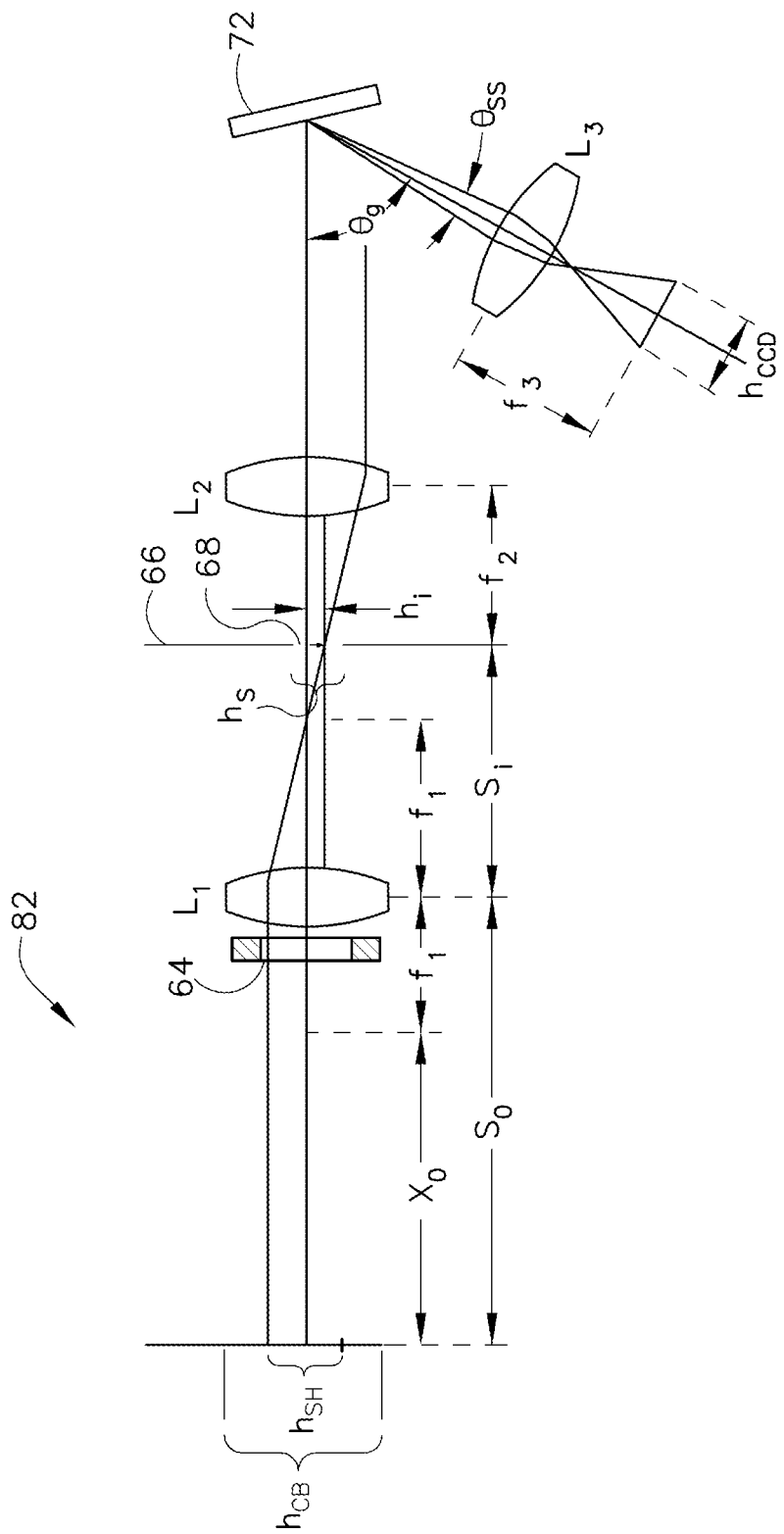
FIG. 8 is a more detailed schematic of the diagram of FIG. 7, according to an exemplary embodiment.

FIGS. 7 and 8 illustrate an alternative embodiment of the present disclosure utilizing separate spectral and spatial processors that process separate acquired images. In this embodiment, both processors may be sampling a line around two inches long. With reference to FIG. 7, a spatial component 80 may include a single channel CCD positioned upstream from a spectral component 82. Spatial component 80 measures the position on web 12 being measured to time the illumination of web 12, and thus the acquisition of the image, by spectral component 82 to ensure that spectral component 82 is acquiring an image of the desired region of web 12. Spatial component 80 and spectral component 82 are connected by a signal bus 84 such that spatial component 80 send a signal to spectral component 82 signaling spectral component 82 when to acquire an image from the printed substrate moving below image processing apparatus 36. Utilizing the separate spatial and spectral images may allow for the illumination of a very thin line across colorbar 206 (or other region within the work), reducing any issues caused by scattered light. Further, the scattered light that does remain is more easily correctable. A continuous light source 42 may be used to illuminate web 12 for spatial component 80, while a strobe may be used to illuminate web 12 for spectral component 82.

In one embodiment, spatial component 80 may include a line-scan CCD that may continuously sample a line across web 12 in the lateral direction. In this design, the spatial resolution of spatial component 80 may be of interest. Circumferentially, this can be determined by the maximum line rate of the processor and the maximum press speed. For example, with a press moving at 3,000 ft/min, and if we want 0.0125" per pixel circumferentially, we need a line rate of 48 kHz. With 0.0125" resolution (or 80 dpi), and the smallest colorbar height being {fraction (1/16)}", this provides for five pixels circumferentially, which should be sufficient to locate colorbar 206. Laterally, the resolution is determined by the optics, the processor size, and the number of pixels. If we want to span two inches laterally, and the sensor has 128 pixels, we have a lateral resolution of 0.0156", or 64 dpi. With a colorbar patch width of 0.1", this provides for 6.4 pixels per colorbar patch, which should be sufficient.

FIG. 8 illustrates the details of the optics design for spectral imaging device 74, according to an exemplary embodiment. The spectral optics are similar to those described above with respect to FIGS. 3 and 4, minus beamsplitter 60, and thus will not be separately discussed.

Figure 9:
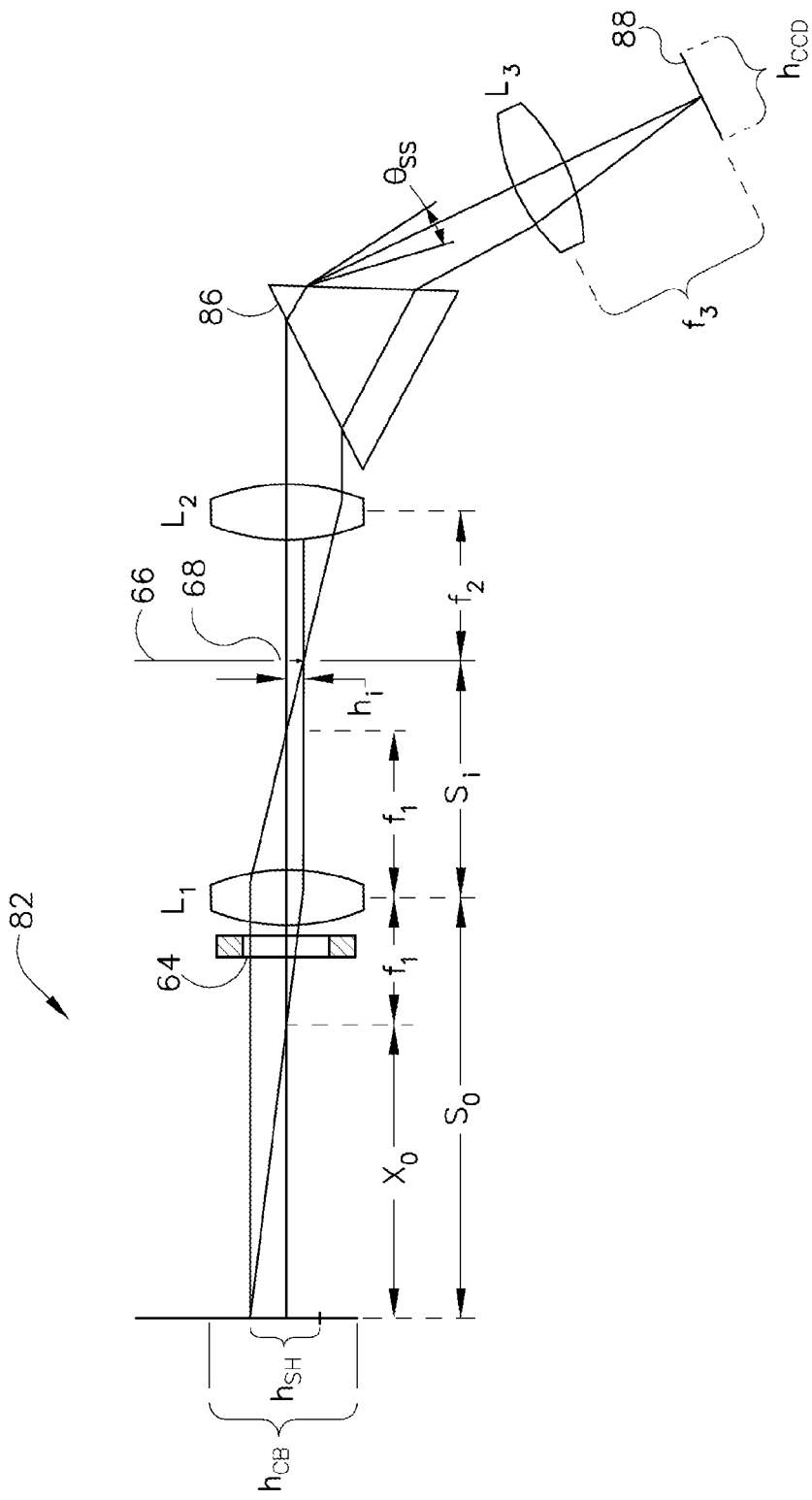
FIG. 9 is a schematic diagram of the optics of the image processing apparatus, according to an exemplary embodiment.

FIG. 9 illustrates an alternative embodiment of the present disclosure. Prism 86 may be used to disperse the light in place of diffraction grating 72, though it is understood that diffraction grating 72 may be used here in the same way as described above for FIG. 4. As mentioned above, prism 86 may also replace diffraction grating 72 in the embodiments of FIG. 4 or 8. Depending on which dispersing element is used in the system, be it prism 86, diffraction grating 72, or other dispersing element, there are different formulas to calculate the angular spread. Utilizing prism 86 results in an angular spread about one half as large as the angular spread described above for FIG. 4. Using prism 86 results in a dispersion vs. wavelength that is highly non-linear (prism 86 spreads the red wavelengths more and compresses the blue wavelengths, resulting in lower resolution) and may be corrected for. If the non-linearity of prism 86 is such that the blue wavelengths are compressed too much to obtain the desired spectral resolution, a smaller slit or a thinner line of illumination can be used. Using prism 86 as a dispersion element does not result in the overlapping spectra described above with respect to diffraction grating 72 of FIG. 4. Thus, no filters may be required before prism 86 to block out unwanted light.

As illustrated in FIG. 9, a single spectral sensor 88 may be used to monitor color quality. A thin line of web 12 is continuously illuminated. Spectral sensor 88 may measure the spectra of web 12 continuously. Spectral sensor 88 may be utilized to build the spatial image by applying a weighted transform that functionally converts spectral sensor 88 to a monochrome sensor. The weighted transform is a mathematical processing of the signal generated by spectral sensor 88. The application of the weighted transform allows spectral sensor 88 to also extract the spatial information.

This embodiment may be used to control the color of printed web 12 without utilizing colorbar 206 as spectral sensor 88 measures multiple lines across printed web 12 continuously, known in the art as markless color control. The circumferential spatial resolution of image processing apparatus 36 may then only be limited by the speed at which spectral sensor 88 can scan web 12, and by the maximum press speed. The spectral resolution, however, is independent of the press speed and spectral sensor 88 speed. Spectral sensor 88 may be a small format area-scan CCD with a fast frame rate that may continuously scan web 12. Spectral sensor 88 may receive an image similar to that shown in FIG. 5. The spectral optics of spectral sensor 88 may not require slit 68 when the area-scan CCD is used to achieve the desired spectral resolution because only a thin line of web 12 is illuminated. However, slit 68 may still be used and may be desirable to ensure that the desired spectral resolution is accomplished. The slit width, or line width where slit 68 is not used, determines the spectral resolution. The spectral optics of this embodiment are very similar to those discussed above with respect to FIG. 4, and thus will not be separately discussed. It is understood that in other embodiments (not shown), spectral sensor 88 may be a line-scan CCD.

Figure 10:
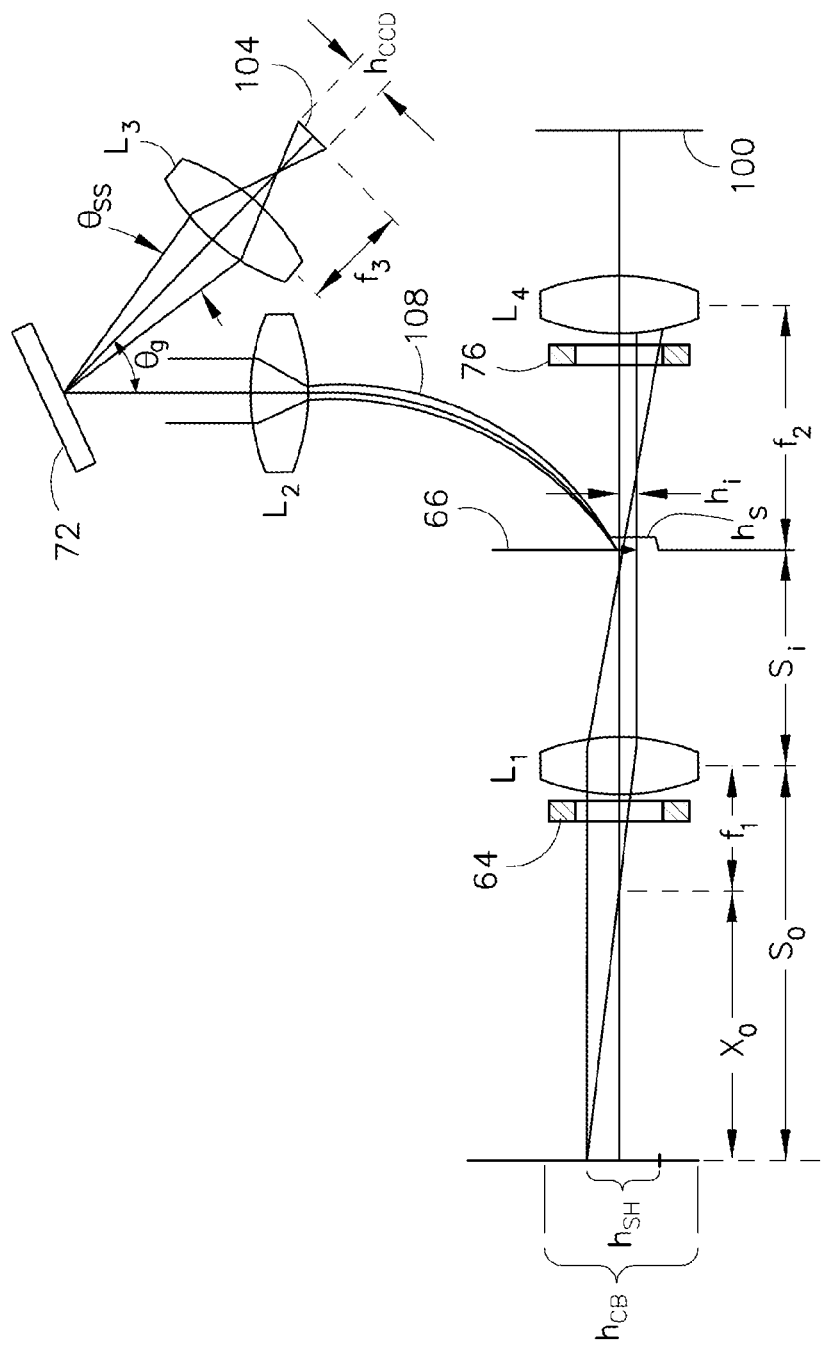
FIG. 10 is a schematic diagram of the optics of the image processing apparatus, according to an exemplary embodiment.
Figure 11:
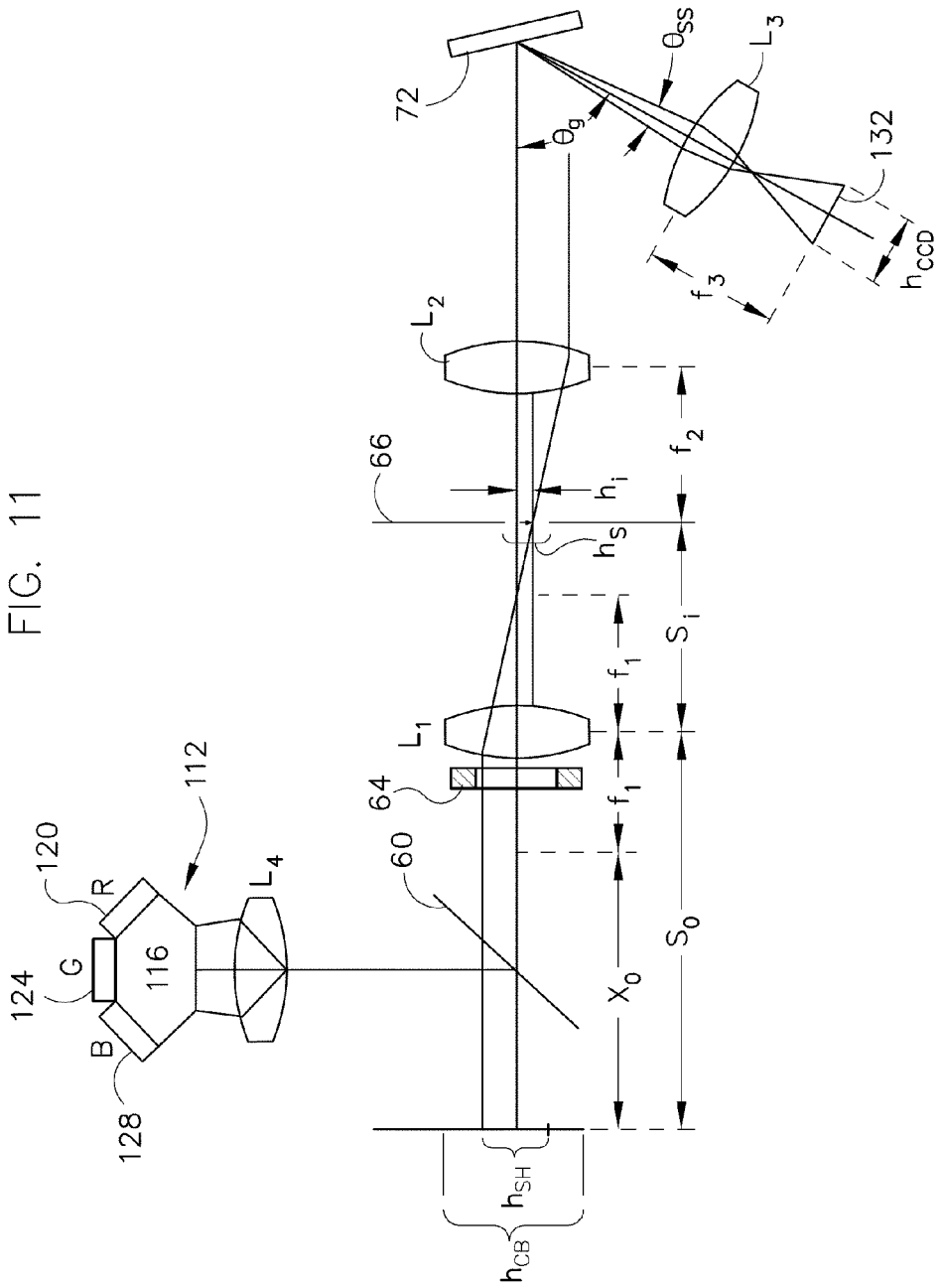
FIG. 11 is a schematic diagram of the optics of the image processing apparatus, according to an exemplary embodiment.

In another aspect of the disclosure as shown in FIGS. 10 and 11, image processing apparatus 36 may include a first processor and a second processor. Both the first and second processors are capable of processing the spectral information from an acquired image and neither of the first or second processors may necessarily be dedicated to processing the spatial or spectral information from the acquired image. When it is said that both processors are capable of processing the spectral information, it is meant that both processors are capable of providing measurements to a control feedback loop or to the press operator in a certain color space and/or color space format.

A color space comprises a color model and a reference color space. To obtain a color space, the color model (e.g., RGB and CMYK are color models) may be added to a mapping function between the color model and a certain reference color space results in a definite footprint or gamut. When the footprint or gamut is combined with the color model a color space is defined (e.g., Adobe RGB and sRGB are two different absolute color spaces, both based on the RGB model). Color spaces may be CIE 1931 XYZ, Adobe RGB, sRGB, Adobe Wide Gamut RGB, CIEL*u*v*, CIEU*v*w*, CIEL*a*b*, CIEL*c*h*, DIN99, etc.

Color space conversion may be the translation of the representation of a color from one color space basis to another color space basis. This may occur in the context of converting an image that is represented in one color space to another color space, the goal being to make the translated image look as similar as possible to the original.

Referring to FIGS. 10 and 11, one of the first processor and second processor may comprise a large format sensor (e.g. it is capable of measuring a large number of pixels of information) and the other processor may comprise a small format sensor (e.g. it may be capable of measuring a smaller number of pixels or even a single pixel). In an exemplary embodiment, a small format sensor may be a sensor that when used in combination with a second sensor (e.g. a large format sensor) measures less pixels then the second sensor. In another exemplary embodiment, a small format sensor may be a sensor that when used in combination with a second sensor (e.g. a large format sensor) measures reflectance units or any other color measurement data more accurately than the second sensor. The small format sensor may be a spot sensor, with at least three channels (e.g., a colorimeter), or a 1×N line scan sensor, where N is the number of spectral bins, and some spectral dispersion element spreads the spectra of the spot along the long dimension of the sensor. The small format sensor may be a 2-D sensor in a hyperspectral imaging device configuration. In another exemplary embodiment, two large format sensors may be utilized. The first large format sensor may be configured to analyze the data utilizing a larger processing time than the second large format sensor. The large format sensor may be any size and could be either an area scan or a line scan sensor. The large format sensor may be an RGB area sensor (e.g., around 256×256 pixels). The RGB to CMYK or RGB to L*a*b* color transforms may be adjusted based on data read from the small format sensor. The color measurement of the acquired image may be implemented using a small format sensor that measures only a single spot of color. However, this may make the color measurement process too slow to be practical for use in web printing applications. The combination of the large format sensor and small format sensor in image processing apparatus 36 may be a compromise of high resolution color measurement and speed. Further, by working together, both the small format sensor and the large format sensor may provide color information in different color spaces, even though the large format sensor may be gray scale, by a calibration algorithm. Based on several measurement comparisons, the large format sensor may be calibrated to the small format sensor by the calculation of slope and offset correction constants. The calculation of different types of correction constants may be possible, for example, with a quadratic correction constant.

Specifically with respect to the idea of calibrating one sensor to the other, a couple of examples follow. Assuming that the small format sensor has an accurate response over its full dynamic range (i.e., any non-linearities are removed by using data from a calibration procedure), and assuming that both sensors have the same spectral resolution, then the small format sensor measures an area included in a larger area measured by the large format sensor. For some spectral channel, the large format sensor may report this small area to read 0.25 reflectance units and the small format sensor may report 0.20 reflectance units for this small area. For another spot, the large format sensor may report 0.85 reflectance units, and the small format sensor may report 0.83 reflectance units. Similar data is collected for many such spots. Some correction is applied to the large format sensor data to make these readings agree in an optimal sense. A simple linear correction: $R_L = a_1 * R_S + a_2$ may be assumed, where $R_L$ is the response of the large format sensor, $R_S$ the response of the small format sensor, and $a_1$ and $a_2$ are constants determined by fitting responses of the sensors to this model. The more data collected and the more the data spans the dynamic ranges of the two sensors, the better the calibration.

However, if it is assumed that the sensors have different spectral resolution, then the spectral response of the low spectral resolution sensor may be approximated with spectral data from the high spectral resolution sensor. Assuming one channel (such as red) of the low spectral resolution sensor has a given spectral response, which may be estimated based upon manufacturer's data, and assuming there is an estimate of the low spectral resolution sensor spectral response in 20 nanometers intervals, then the high spectral resolution sensor might measure at 5 nanometers resolution. The manufacturer's data may be interpolated to obtain 5 nanometers spectral data. Then, a broad bandwidth filter is applied to the high spectral resolution sensor data to approximate what the low spectral resolution sensor may see in the red channel. Now, one sensor can be fit to the other as described in the previous paragraph.

The small format sensor may be removed from image processing apparatus 36 and image processing apparatus 36 may still perform its functions, though the color measurement will be at a lower resolution. This allows for accurate off-line calibration of the small sensor without a stoppage of the equipment being necessary. This increases the efficiency of the system in that image processing can still take place when calibration of the small format sensor is necessary (i.e., when the small format sensor is not functioning) and also increases the repeatability of measurements between the color desk sensor and the on-line sensor. The removable small format sensor can be installed into a desktop color measurement device, which will allow for direct comparison (and hence, calibration) of color measurements between the on-press and off-press devices. It also may allow current systems that utilize only the large format to be upgraded by the addition of the small format sensor.

Referring to FIG. 10, the first processor is a large format sensor, such as a single black and white CCD sensor 100, according to an exemplary embodiment. One such sensor 100 that may be used is model number KAF-0261E, available from Kodak. In general, sensor 100 may process the spatial information from the acquired image, however, it is understood that sensor 100 may be capable of processing the spectral information as well. Generally, sensor 100 has low spectral resolution to increase the processing speed of image processing apparatus 36. Many of the details of the optics in FIG. 10 and their proper placement and/or alignment are explained in detail above with respect to FIG. 4 and therefore will not be discussed here.

The second processor is a small format sensor, such as a line-scan CCD sensor 104. Line-scan CCD sensors 104 may be model number IL-P3-0512 available from Dalsa Corporation of Waterloo, Ontario Canada, or model number CCD39-02, available from e2v technologies of Elmsford, N.Y. Line-scan CCD sensor 104 may measure a point of color and has a high spectral resolution. Line-scan CCD sensor 104 may process the spectral information from the acquired image. As illustrated in FIG. 10, a fiber optic bundle 108 receives at least a portion of the acquired image from slit 68 and transports that portion of the image to the collimating lens L2. Fiber optic bundle 108 may receive 100% of a first portion of the light reflected from web 12. The remaining portion (a second portion of the reflected light) of the acquired image may then be directed to line-scan CCD sensor 104. It is understood by one of skill in the art that beamsplitter 60 may be used in addition to fiber optic bundle 108 to deliver the image to the lens $L_2$ such that the fields of view of sensor 100 and line-scan CCD sensor 104 overlap. It is also understood that a mirror may be used in place of fiber optic bundle 108.

The lens $L_2$ transmits light as a parallel beam to the ruled diffraction grating 72. It is understood that a transmission-type diffraction grating 72 or prism 86 may be used instead of diffraction grating 72 as the dispersion element. It is also understood that a color filter wheel or other changeable color filters may be used instead of diffraction grating 72 or prism 86. Diffraction grating 72 disperses light into its spectral components along a known angular spread. The focusing lens $L_3$ focuses the dispersed light onto line-scan CCD sensor 104.

Sensor 100 and line-scan CCD sensor 104 may be in communication with each other (with reference to FIG. 7) such that information generated by one sensor may be used to direct the function of the other. For example, sensor 100 may take a picture of the printed substrate that includes the area to be analyzed. This information may be used to register line-scan CCD sensor 104 in that the information obtained from sensor 100 directs line-scan CCD sensor 104 when to snap its picture to ensure that line-scan CCD sensor 104, which takes a much smaller picture than sensor 100, gets an image of the appropriate area.

In return, line-scan CCD sensor 104, which has a higher resolution and measures a much smaller area, may be used to calibrate sensor 100. For example, because line-scan CCD sensor 104 acquires an image in less light, line-scan CCD sensor 104 may be less affected by scattered light. By comparing the measurements from line-scan CCD sensor 104 with sensor 100, which takes in a greater amount of light and thus is more affected by scattered light, sensor 100 may be adjusted to remove the inaccuracies caused by the scattered light based upon the more accurate measurement from line-scan CCD sensor 104. Other measurement inaccuracies, such as non-linearity problems, may also be calibrated out by comparing readings between sensor 100 and line-scan CCD sensor 104.

FIG. 11 illustrates an alternative embodiment of the disclosure. In general, the first processor may process the spatial information from an acquired image of the printed substrate and the second processor may process the spectral information, though it is understood that both the first and second processors may be capable of processing spectral information from an acquired image, as is defined above.

The first processor may include a large format sensor, such as a three CCD, RGB color sensor 112. RGB color sensor 112 may include a dichroic prism 116 and a three CCD array including a red color filter 120, a green color filter 124, and a blue color filter 128. Red color filter 120 may transmit the red light and reflects blue and green light back into dichroic prism 116. Similarly, green color filter 124 may transmit green light, and blue color filter 128 may transmit blue light. In this way, none of the light transmitted into dichroic prism 116 is lost.

The image processing device of FIG. 11 utilizes the RGB color sensor 112 as the first processor, and a small format sensor, such as an area-scan CCD sensor 132, as the second processor. Area-scan CCD sensor 132 may have a high spectral resolution and may measure a line of color across the printed substrate. Generally, area-scan CCD sensor 132 may have a greater spectral resolution than, but will also be much slower than, RGB color sensor 112.

In the embodiment of FIG. 11, RGB color sensor 112 and area-scan CCD sensor 132 may analyze an acquired image. As illustrated, beamsplitter 60 reflects a portion of the acquired image from the printed substrate and directs the acquired image to RGB color sensor 112. For example, if beamsplitter 60 has a reflectance of fifty percent, fifty percent of the reflected light is directed to RGB color sensor 112. The other fifty percent is directed to area scan CCD sensor 132 and thus area-scan CCD 132 sees the same acquired image. Overall, the specific optics design for area-scan CCD sensor 132 may be similar to those described above with respect to FIG. 4 and thus will not be described again here. In an exemplary embodiment, a line-scan sensor may obtain image data from a region (e.g., a line) which has a width of one pixel and a length of multiple pixels. In another exemplary embodiment, an area-scan sensor may obtain image data from a region which has a width of more than one pixel and a length of more than one pixel.

Although the description contains many specifics, these specifics are utilized to illustrate some of the exemplary embodiments of this disclosure and should not be construed as limiting the scope of the disclosure. The scope of this disclosure should be determined by the claims, their legal equivalents and the fact that it fully encompasses other embodiments which may become apparent to those skilled in the art. All structural, chemical, and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims. It is to be understood that the disclosure is not limited in its application to the details of construction and the arrangement of components set forth in the description or illustrated in the drawings. The disclosure is capable of other embodiments and of being practiced in various ways. Also, it is to be understood that the phraseology used herein is for the purpose of description and should not be regarded as limiting. It should be noted that module, system, or apparatus may refer to a functional unit related to a method, a device, software, or any combination thereof, any may be operable or found in one or more pieces or software, or be a combination of software and non-software systems. Use of the term module, system, or apparatus herein may refer to either computer program and/or circuit components operating the computer program (e.g., one or more computers, servers, etc.) to carry out the functions described herein, either automatically without user input or under control of a user. Module, system, or apparatus may interface with other modules, systems, or apparatuses at a hardware and/or computer program level, and may operate at and/or interface with other modules, systems, or apparatuses at any applicable computer program level specified in the Open Systems Interconnection (OSI) model, such as application layer, presentation layer, session layer, transport layer, network layer, data link, physical layer, etc. Modules, systems, or apparatuses may be represented by a block, multiple blocks or portions of blocks in the various figures herein.

What is claimed is:

1. An image processing apparatus for use with a printed substrate, the image processing apparatus comprising:
    a first imaging device configured to receive light reflected from the printed substrate and configured to process color data from the light; and
    a second imaging device configured to receive light reflected from the printed substrate and configured to process spatial information from the light;
    wherein the first imaging device is configured to acquire a first image of a portion of the printed substrate and the second imaging device is configured to acquire a second image of a portion of the printed substrate, wherein at least a portion of the first image and the second image are acquired from the same portion of the printed substrate at the same time, and wherein the first imaging device is configured to process the color data from the first image using a first processing circuit of the first imaging device and the second imaging device is configured to process the spatial information from the second image using a separate second processing circuit of the second imaging device.

2. The image processing apparatus of claim 1, wherein the first imaging device is configured to process the color data from light reflected from a colorbar.

3. The image processing apparatus of claim 2, wherein the first imaging device is configured to process the color data from light reflected from a portion of multiple patches of the colorbar.

4. The image processing apparatus of claim 1, wherein the first imaging device comprises a line-scan sensor.

5. The image processing apparatus of claim 1, wherein the second imaging device comprises an area-scan CCD sensor.

6. The image processing apparatus of claim 1, wherein the second imaging device is coupled to a fiber optic bundle to capture and direct the light reflected from the printed substrate to the second imaging device.

7. The image processing apparatus of claim 1, wherein the first imaging device has a higher spectral resolution than the second imaging device.

8. The image processing apparatus of claim 1, wherein the first imaging device acquires an image based on a signal from the second imaging device.

9. The image processing apparatus of claim 1, wherein the spatial information from the second imaging device is used to control registration of the first imaging device.

10. The image processing apparatus of claim 1, wherein the color data from the first imaging device is used to calibrate the second imaging device.

11. The image processing apparatus of claim 1, wherein a first dynamic sensor range of the first imaging device and a second dynamic sensor range of the second imaging device are different.

12. The image processing apparatus of claim 1, further comprising an illuminator, the illuminator configured to illuminate a first area based on a first control signal and to illuminate a second area based on a second control signal;
    wherein the second control signal is based on locating the colorbar; and
    wherein the second area is smaller than the first area.

13. The image processing apparatus of claim 1, further comprising a housing in which both the first imaging device and the second imaging device are positioned, wherein the first imaging device and the second imaging device are positioned in the housing in such a manner that the first imaging device and the second imaging device are directed at the same portion of the printed substrate.

14. An image processing apparatus for use with a printed substrate, the image processing apparatus comprising:
    a first imaging device configured to receive light reflected from a portion of a colorbar on the printed substrate and configured to process color data from the light reflected from the portion of the colorbar; and
    a second imaging device configured to receive light reflected from the printed substrate and configured to process spatial information from the light;
    wherein the first imaging device is configured to acquire a first image of a portion of the printed substrate and the second imaging device is configured to acquire a second image of a portion of the printed substrate, wherein at least a portion of the first image and the second image are acquired from the same portion of the printed substrate at the same time, and wherein the first imaging device is configured to process the color data from the first image using a first processing circuit of the first imaging device and the second imaging device is configured to process the spatial information from the second image using a separate second processing circuit of the second imaging device.

15. The image processing apparatus of claim 14, wherein the portion of the colorbar comprises a slice of multiple patches of the colorbar.

16. The image processing apparatus of claim 14, wherein the color data from the first imaging device is used to calibrate the second imaging device.

17. The image processing apparatus of claim 14, further comprising an illuminator, the illuminator configured to illuminate a first area based on a first control signal and to illuminate a second area based on a second control signal;
    wherein the second control signal is based on locating the colorbar; and
    wherein the second area is smaller than the first area.

18. A method comprising:
    acquiring a first image of a portion of a printed substrate using a first imaging device;
    acquiring a second image of a portion of the printed substrate using a second imaging device, wherein at least a portion of the first image and the second image are acquired from the same portion of the printed substrate at the same time;

processing color data from the first image using a first processing circuit of the first imaging device; and processing spatial information from the second image using a separate second processing circuit of the second imaging device.

19. The method of claim 18, wherein acquiring the first image comprises acquiring the first image from light reflected from a colorbar.

20. The method of claim 19, wherein acquiring the first image comprises acquiring the first image from light reflected from a portion of multiple patches of the colorbar.

* * * * *